United States Patent
Parrish et al.

(10) Patent No.: US 6,812,465 B2
(45) Date of Patent: Nov. 2, 2004

(54) MICROBOLOMETER FOCAL PLANE ARRAY METHODS AND CIRCUITRY

(75) Inventors: William J. Parrish, Santa Barbara, CA (US); Jeffrey L. Heath, Santa Barbara, CA (US); Naseem Y. Aziz, Goleta, CA (US); Joseph Kostrzewa, Solvang, CA (US); George H. Poe, Goleta, CA (US)

(73) Assignee: Indigo Systems Corporation, Goleta, CA (US)

( * ) Notice: Subject to any disclaimer, the term of this patent is extended or adjusted under 35 U.S.C. 154(b) by 230 days.

(21) Appl. No.: 10/085,226

(22) Filed: Feb. 27, 2002

(65) Prior Publication Data

US 2003/0160171 A1 Aug. 28, 2003

(51) Int. Cl.[7] .................................................. G01J 5/00
(52) U.S. Cl. .................................. 250/338.1; 250/336.1
(58) Field of Search ........................... 250/336.1, 338.1

(56) References Cited

U.S. PATENT DOCUMENTS

| | | | |
|---|---|---|---|
| 4,947,057 A | | 8/1990 | Czarnocki et al. |
| 5,756,999 A | * | 5/1998 | Parrish et al. ............... 250/332 |
| 6,028,309 A | * | 2/2000 | Parrish et al. ............... 250/332 |
| 6,267,501 B1 | * | 7/2001 | Wand et al. ................. 374/124 |
| 6,300,616 B1 | * | 10/2001 | Regensburger ........ 250/214 LA |
| 6,359,460 B1 | * | 3/2002 | Tanaka ........................ 324/765 |
| 6,441,372 B1 | * | 8/2002 | Kawahara .................... 250/332 |
| 2002/0040967 A1 | * | 4/2002 | Oda ........................ 250/338.1 |
| 2003/0006374 A1 | * | 1/2003 | McManus ................. 250/338.1 |
| 2003/0122077 A1 | * | 7/2003 | Kaufman et al. ............ 250/332 |
| 2003/0146383 A1 | * | 8/2003 | Knauth et al. ............ 250/338.1 |
| 2003/0213910 A1 | * | 11/2003 | Anderson et al. ......... 250/338.1 |

OTHER PUBLICATIONS

International Preliminary Exaimination Report for PCT/US03/05455.
International Search Report for PCT/US03/05455.
Written Opinion for PCT/US03/05455.

* cited by examiner

*Primary Examiner*—David Porta
*Assistant Examiner*—Christine Sung
(74) *Attorney, Agent, or Firm*—MacPherson Kwok Chen & Heid LLP; Greg J. Michelson

(57) ABSTRACT

Microbolometer circuitry and methods are disclosed to allow an individual microbolometer or groups of microbolometers, such as a microbolometer focal plane array, to operate over a wide temperature range. Temperature compensation is provided, such as through circuitry and/or calibration methods, to reduce non-uniform behavior over the desired operating temperatures. For example, the relative mismatch in the temperature coefficient of resistance of an active microbolometer and a reference microbolometer is compensated by employing a variable resistor in series with the active microbolometer. The variable resistor can be calibrated over the desired temperature range to minimize the affect of the relative mismatch. Various other circuit implementations, calibration methods, and processing of the microbolometer circuit output can be employed to provide further compensation.

58 Claims, 19 Drawing Sheets

| RDAC value | ODAC value | Pixel output value at T1 |
|---|---|---|
| 1 | ODAC₁ | 40% |
| 2 | ODAC₂ | 45% |
| 3 | ODAC₃ | 50% |

| RDAC value | ODAC value | Pixel output value at T1 | Pixel output value at T2 |
|---|---|---|---|
| 1 | ODAC₁ | 40% | 20% |
| 2 | ODAC₂ | 45% | 50% |
| 3 | ODAC₃ | 50% | 80% |

MICROBOLOMETER FOCAL PLANE ARRAY METHODS AND CIRCUITRY

BACKGROUND OF THE INVENTION

1. Field of the Invention

The present invention relates generally to focal plane arrays and, more particularly, to microbolometer focal plane arrays.

2. Related Art

A microbolometer, which detects infrared radiation, is well known in the art. Modern microbolometer structures are typically fabricated on monolithic silicon substrates to form an array of microbolometers, with each microbolometer functioning as a pixel to produce a two-dimensional image. The change in resistance of each microbolometer is translated into a time-multiplexed electrical signal by circuitry known as the read out integrated circuit (ROIC). The combination of the ROIC and the microbolometer array is commonly known as a microbolometer focal plane array (FPA) or microbolometer infrared FPA. Microbolometers are described in further detail in U.S. Pat. Nos. 5,756,999 and 6,028,309, which are herein incorporated by reference in their entirety.

Microbolometer array performance is typically degraded due to non-uniform responses among the individual microbolometer detectors to uniform incident infrared radiation. Factors contributing to the performance degradation include variations in the infrared radiation absorption coefficient, resistance, temperature coefficient of resistance (TCR), heat capacity, and thermal conductivity of the individual detectors. Because the magnitude of the non-uniformity can be substantially larger than the magnitude of the actual response due to the incident infrared radiation, various techniques are typically required to compensate for the non-uniformity and acquire the portion of the signal representing the incident infrared radiation.

FIG. 1 illustrates a conventional method for measuring the microbolometer resistance. A voltage (V) is applied across the series combination of a microbolometer 3 (that can receive incident infrared radiation 1) and a resistive load ($R_{load}$) 6. An output voltage (Vout) is measured across microbolometer 3 to determine its resistance ($R_{bolometer}$), according to the following equation.

$$R_{bolometer} = R_{load}/(V/V_{out} - 1)$$

The temperature rise in microbolometer 3 due to self-heating generally is significantly larger than the temperature rise resulting from the incident infrared radiation. If the voltage (V) is multiplexed or periodically applied during each sample period, the self-heating behavior is as shown in FIG. 2. The microbolometer temperature rises significantly during each sample period (also referred to as a bias period and indicated by a pulse bias spike in the figure).

One drawback of this characteristic is that the pulse bias heating causes the microbolometer 3 (also referred to as the active microbolometer and which is thermally isolated from the substrate) to operate at a different temperature than resistive load 6 (which may also be a microbolometer and referred to as the load microbolometer that is thermally shorted to the substrate). Also, various other non-uniformities or variables between microbolometer 3 and resistive load 6 may cause a difference in the TCR between the two microbolometers. Thus, the pulse bias heating and other factors contribute to a mismatch in relative TCR between resistive load 6 and microbolometer 3.

This mismatch in relative TCR limits the range of operating temperatures for the microbolometer array. For example, as shown by the graph in FIG. 3, the output voltage for a microbolometer in the microbolometer array drops below the minimum dynamic range of the system prior to reaching the maximum desired substrate temperature. Alternatively as shown in FIG. 4, the output voltage for another microbolometer in the microbolometer array rises above the maximum dynamic range of the system prior to reaching the maximum desired substrate temperature.

For a typical microbolometer array, the output voltage produced by each microbolometer may vary over substrate temperature significantly, as shown in FIG. 5, for six exemplary microbolometers from the microbolometer array. The average output voltage from a certain number of microbolometer elements exceeds the minimum and maximum signal range, as shown in the histogram in FIG. 6, resulting in unsatisfactory FPA performance within the desired temperature range of operation.

Conventional microbolometer arrays often provide a correctable output only within a small range of substrate temperatures, on the order of 0.005 to 0.025 degrees Kelvin. A thermo-electric cooler, temperature sensor, and temperature control electronics are employed to maintain the substrate temperature within this range to minimize microbolometer array non-uniformities, which adds to system cost and complexity. As a result, there is a need for techniques that address microbolometer array properties and non-uniformities over a wider range of temperatures.

BRIEF SUMMARY OF THE INVENTION

Microbolometer circuitry and methods are disclosed herein. In accordance with one embodiment, microbolometer focal plane array (FPA) circuitry is disclosed that provides temperature compensation over a wide temperature range. The relative mismatch in TCR between the active microbolometers and the load or reference microbolometers is compensated to allow the removal of strict temperature stability requirements. For example, rather than requiring temperature stability of the microbolometer array to within a fraction of a degree, the operating temperature range may be expanded significantly, such as from −40° to 55° C. Methods are also disclosed for providing calibration and applying the calibration values to the microbolometer FPA circuitry and to processing of the resulting signal values from the microbolometer FPA circuitry. Thus, circuitry and methods disclosed herein overcome many of the disadvantages of the prior art, such as complex and costly cooling systems, and provide infrared technology more applicable to low-cost, high-volume commercial markets.

More specifically, in accordance with one embodiment of the present invention, a microbolometer circuit includes a first microbolometer, a variable resistor coupled to the first microbolometer, and a biasing circuit coupled to the first microbolometer or the variable resistor to provide a load current.

In accordance with another embodiment of the present invention, a method of calibrating a microbolometer detector circuit includes calibrating a variable resistor to compensate for a relative temperature coefficient of resistance between an active microbolometer and a load over a desired temperature range; and calibrating an offset for an output signal generated by the microbolometer detector circuit.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

The preferred embodiments of the present invention and their advantages are best understood by referring to the detailed description that follows. It should be appreciated that like reference numerals are used to identify like elements illustrated in one or more of the figures.

DETAILED DESCRIPTION OF THE INVENTION

Figure 7A:
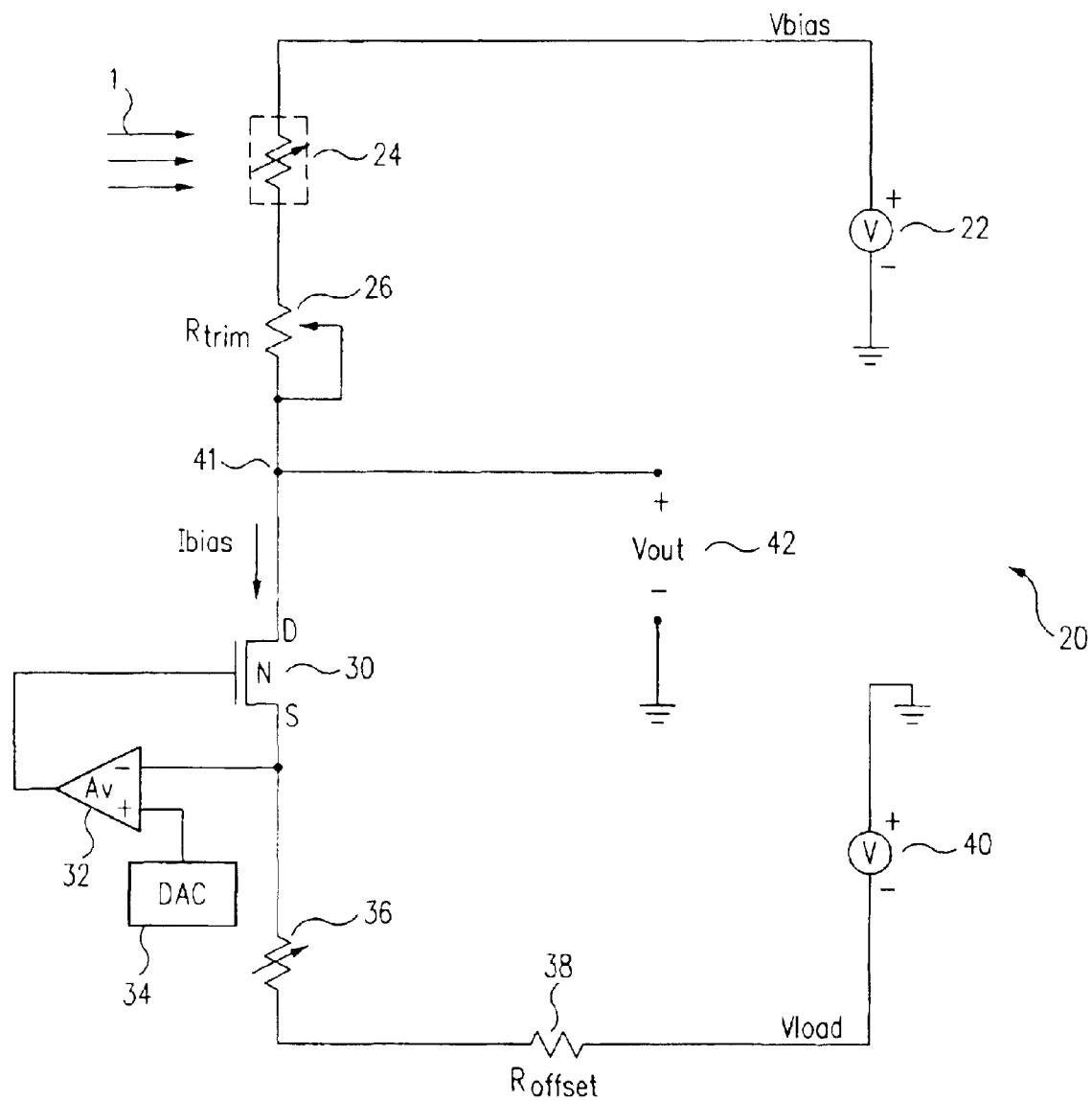
FIG. 7a shows a circuit for providing temperature compensation in accordance with an embodiment of the present invention.

FIG. 7a shows a circuit 20 providing temperature compensation in accordance with an embodiment of the present invention. Circuit 20 includes supply voltages 22 and 40, microbolometers 24 and 36, resistors 26 and 38, transistor 30, amplifier 32, and a digital-to-analog converter (DAC) 34. As explained in detail herein, circuit 20 provides substrate temperature compensation and TCR mismatch compensation for the active and load microbolometers.

The active microbolometer is the thermally isolated microbolometer 24 that receives incident infrared radiation 1. Microbolometer 24 is biased by supply voltage 22 and a load current (Ibias). Amplifier 32 provides the gate bias for transistor 30 (an NMOS transistor), while DAC 34 is used to set a reference voltage and control amplifier 32 to set the appropriate gate bias for transistor 30. Alternatively, amplifier 32 can be eliminated and DAC 34 used to set the appropriate gate bias directly for transistor 30. A load circuit or bias circuit includes supply voltage 40, resistor 38, microbolometer 36, transistor 30, and amplifier 32 with DAC 34, which are used to establish the load current (Ibias).

Microbolometer 36, which is a thermally shorted (to the substrate) load microbolometer, is used as a substrate temperature compensated load. Supply voltage 40 is set to optimize the operating point for circuit 20 by setting the nominal voltage drop across microbolometer 36. An output voltage (Vout) 42 of circuit 20 is provided at a node 41.

Figure 7B:
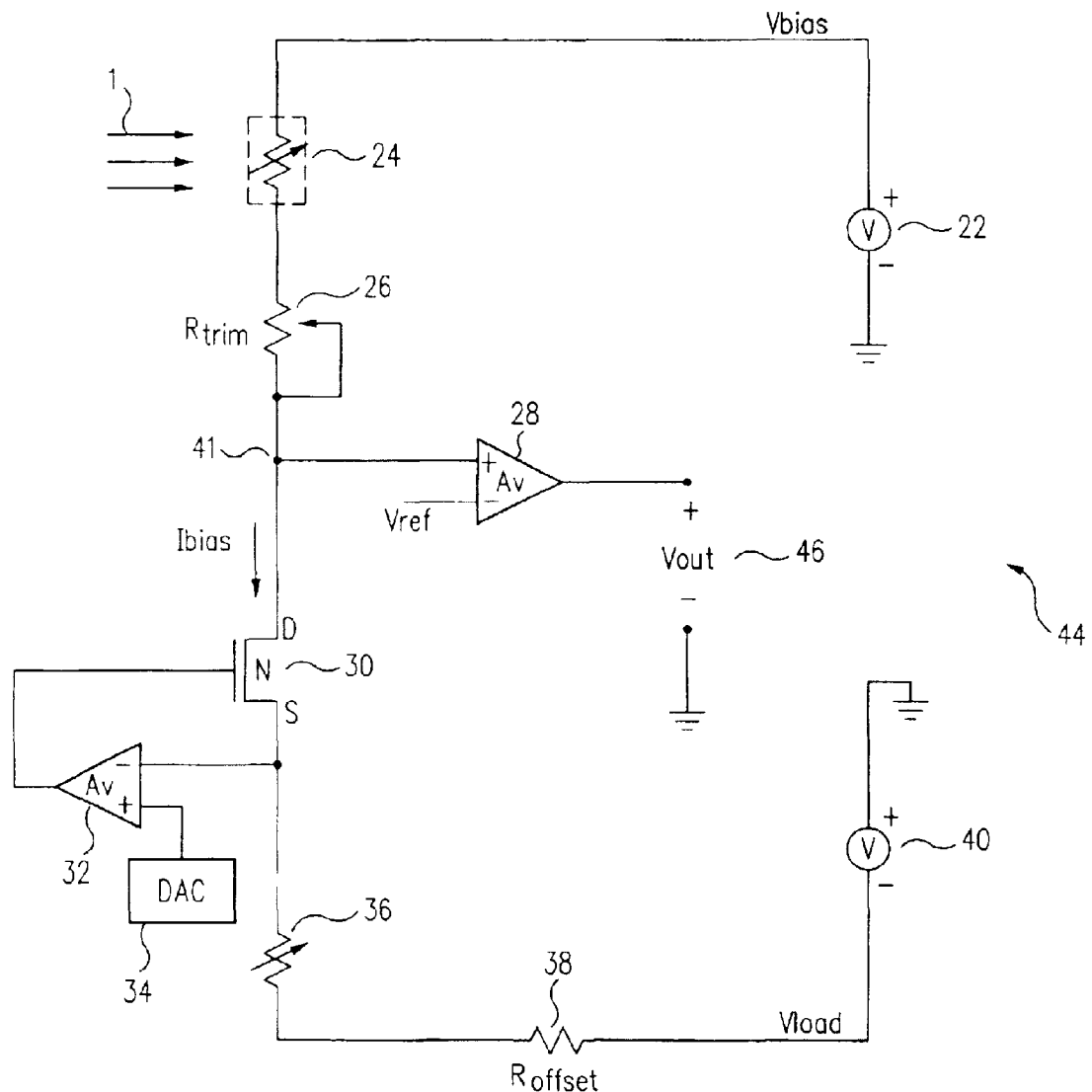
FIG. 7b shows a circuit for providing temperature compensation in accordance with another embodiment of the present invention.

FIG. 7b shows a circuit 44 for providing temperature compensation in accordance with another embodiment of the present invention. Circuit 44 is similar to circuit 20, but includes an amplifier 28, which amplifies the voltage at node 41 to provide an output voltage (Vout) 46. Amplifier 28 is an exemplary circuit element to provide amplification or buffering for the voltage at node 41, if desired. As with amplifier 32, a DAC may provide the reference voltage (Vref) for the amplifier or the reference voltage may be at a set voltage level (e.g., ground). It should be apparent that output voltage (Vout) 42 may be translated, amplified, or converted by amplification or integration processes and/or other well known signal processing techniques. Further references herein to output voltage (Vout) 42 would be also applicable to output voltage (Vout) 46.

In terms of general circuit operation for circuits 20 and 44, as incident infrared radiation 1 levels increase, the temperature of microbolometer 24 increases, which lowers its resistance, reduces the voltage drop across microbolometer 24, and increases the voltage level at the drain terminal of transistor 30 (i.e., node 41). This change in the voltage drop across microbolometer 24 causes a change in output voltage (Vout) 42. Therefore, as incident infrared radiation 1 levels increase or decrease, this is reflected by the voltage level of output voltage (Vout) 42 increasing or decreasing, respectively.

In general, supply voltage 40 is used to adjust the load current and thereby optimize the operating point of the circuit by setting output voltage 42 at a desired point within a range of output circuitry voltage levels. Specifically, by setting the appropriate gate bias of transistor 30 and appropriate voltage level of supply voltage 40, the output voltage (Vout) 42 is adjusted.

For example, supply voltage 40 may be a single voltage level set for the entire array of microbolometers. Amplifier 32 and DAC 34 are then used to supply a unique voltage bias to each corresponding thermally-shorted microbolometer 36 in the FPA to provide a fine adjustment or offset to the load voltage or the load current (Ibias). This corrects for the individual offset errors in the output signals from each of the thermally-isolated microbolometers (e.g., microbolometer 24). By adjusting the offset for each microbolometer circuit, the nominal output voltage level of output voltage (Vout) 42 for each circuit is adjusted to fall within a desired range.

To address the relative mismatch in TCR between microbolometer 24 (the active microbolometer) and microbolometer 36 (the load microbolometer), resistors 26 and 38 are provided. Resistor 26 is a variable resistor to generally provide fine adjustments to the composite TCR value of the active microbolometer portion of the circuit relative to the load microbolometer portion of the circuit. Thus, for the voltage divider network of resistors, resistor 26 adjusts the composite TCR of microbolometer 24 and resistor 26 relative to microbolometer 36 and resistor 38. As an example, circuit values for these circuit elements are 100 KΩ and 300 KΩ for microbolometers 24 and 36, respectively, but these values are not limiting and may vary over a large range, such as for example 50–200 KΩ and 150–600 KΩ, respectively. Exemplary circuit values for resistors 26 and 38 may, for example, vary within 0–10 KΩ and 0–30 KΩ, respectively, but this range is not limiting and may vary over a wider range of values.

Resistors 26 and resistors 38 are typically resistors having a different TCR (generally lower) than respective microbolometers 24 and 36. For example, resistor 26 may have a low TCR and microbolometer 24 may have a higher TCR relative to microbolometer 36. Consequently, by the proper selection of resistance value for resistor 26, the combination of resistor 26 and microbolometer 24 provides a TCR that is much closer to the TCR of microbolometer 36 than is the TCR of solely microbolometer 24. Therefore, the performance and behavior of each microbolometer within the array is vastly improved over a range of substrate temperatures.

The following equation illustrates the combined or composite TCR for a microbolometer in series with a variable resistor (i.e., microbolometer 24 and resistor 26) as a function of temperature.

$$TCR=(TCR_{Bo}R_B(T)/(R_B(T)+R_{Trim}))$$

TCR, $TCR_{Bo}$, $R_B(T)$, and $R_{Trim}$ represent the effective combined TCR (labeled TCR), the TCR of the microbolometer (labeled $TCR_{Bo}$), the resistance of the microbolometer at a given temperature (labeled $R_B(T)$), and the resistance value of the variable resistor (e.g., to a first order constant as a function of temperature and labeled $R_{Trim}$), respectively. This equation illustrates how the combined TCR is adjusted depending upon the resistance value of the variable resistor.

Resistor 38 provides the coarse adjustment for circuit 20. Consequently by setting resistor 26, temperature compensation is provided for the mismatch in relative TCR between the active microbolometer and the load microbolometer. A calibration procedure as a function of the substrate temperature is performed to determine the appropriate value for resistors 26 and 38. Details of an exemplary calibration procedure are provided below.

Figure 8:
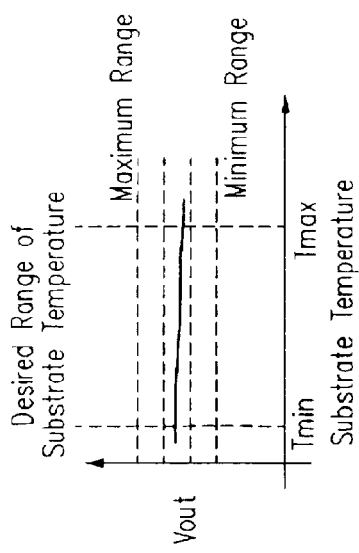
FIG. 8 shows a graph of microbolometer circuit output voltage as a function of substrate temperature in accordance with an embodiment of the present invention.

The relative mismatch in TCR is driven by various factors, such as pulse bias heating, non-uniformities among microbolometers, and relative contact resistance between the active microbolometer and the load microbolometer and the substrate. The characteristics discussed above for FIGS. 3 through 6 are attributable to a certain extent to the relative mismatch in TCR between the load and active microbolometer. Ideally, by accounting for the relative mismatch in TCR and offset as a function of substrate temperature, the output voltage for a given microbolometer circuit will be well behaved as shown in FIG. 8. As can be seen, for a certain level of received incident infrared radiation, the microbolometer circuit output voltage falls within a small percentage (e.g., twenty percent) of the minimum and maximum dynamic range over the desired substrate temperature range (e.g., 100° C.).

Figure 9:
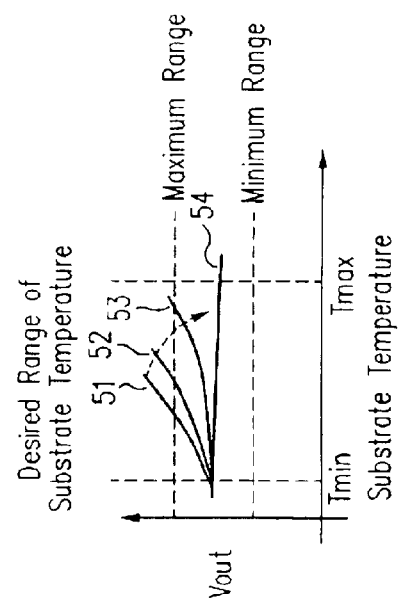
FIG. 9 shows a graph of microbolometer circuit output voltage as a function of substrate temperature, which illustrates temperature compensation techniques, in accordance with an embodiment of the present invention.

FIG. 9 shows a graph of microbolometer circuit output voltage as a function of substrate temperature, which illustrates temperature compensation techniques, in accordance with an embodiment of the present invention. Curves 51 through 54 in the figure illustrate, for a given offset, the output voltage for a microbolometer for various resistor trim values (e.g., output voltage 42 for various values of resistor 26).

For example, in reference to FIG. 7a, if the relative mismatch in TCR between microbolometer 24 and microbolometer 36 is such that as the substrate temperature rises, the resistance of microbolometer 24 decreases at a faster rate than microbolometer 36, output voltage 42 will increase as the substrate temperature rises for a given level of incident infrared radiation. This may be represented by curve 51 (FIG. 9) for a minimum resistor value for resistor 26.

Figure 10:
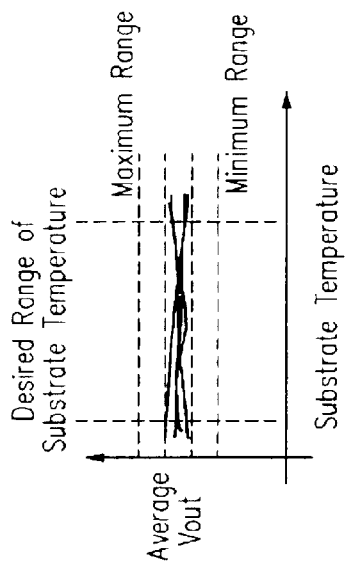
FIG. 10 shows a graph of microbolometer circuit output voltages from a microbolometer array after implementation of temperature compensation techniques in accordance with an embodiment of the present invention.
Figure 11:
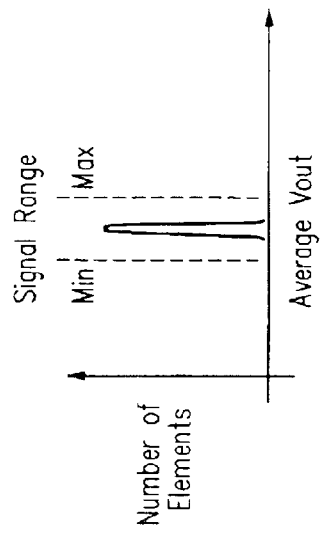
FIG. 11 shows a histogram of microbolometer circuit output voltage for a microbolometer array relative to a desired signal range after implementation of temperature compensation techniques in accordance with an embodiment of the present invention.

If the measurements were repeated over the same substrate temperature range but the resistor value for resistor 26 was increased and the offset adjusted so that output value 42 is returned to the initial value for minimum substrate temperature (as shown in FIG. 9), output voltage 42 will increase at a lower rate. This may be represented by curve 52. This process could be repeated for various values of resistor 26 to obtain curves, such as curves 53 and 54. It should be clear that from among curves 51 through 54, curve 54 provides the best response over the desired substrate temperature. Furthermore, this procedure could be performed to obtain optimal resistor settings for each microbolometer in the array to achieve performance such as illustrated in FIGS. 10 and 11. Note that a detailed exemplary calibration process and operational application are discussed in detail below.

FIG. 10 shows a graph of microbolometer circuit output voltages from a microbolometer array after implementation of temperature compensation techniques discussed herein. After calibration of a number of microbolometers in the array to compensate for offset and relative mismatch in TCR, all of the microbolometer circuit output voltages fall within a small percentage of dynamic signal range across the desired substrate temperature range. Furthermore, as shown in the histogram in FIG. 11, all of the microbolometer circuit output voltages within the array fall within the available signal range and provide a predictable response. The microbolometer FPA performance illustrated in FIGS. 10 and 11 represents a significant improvement over conventional microbolometer FPA performance, such as illustrated respectively in FIGS. 5 and 6.

Figure 1:
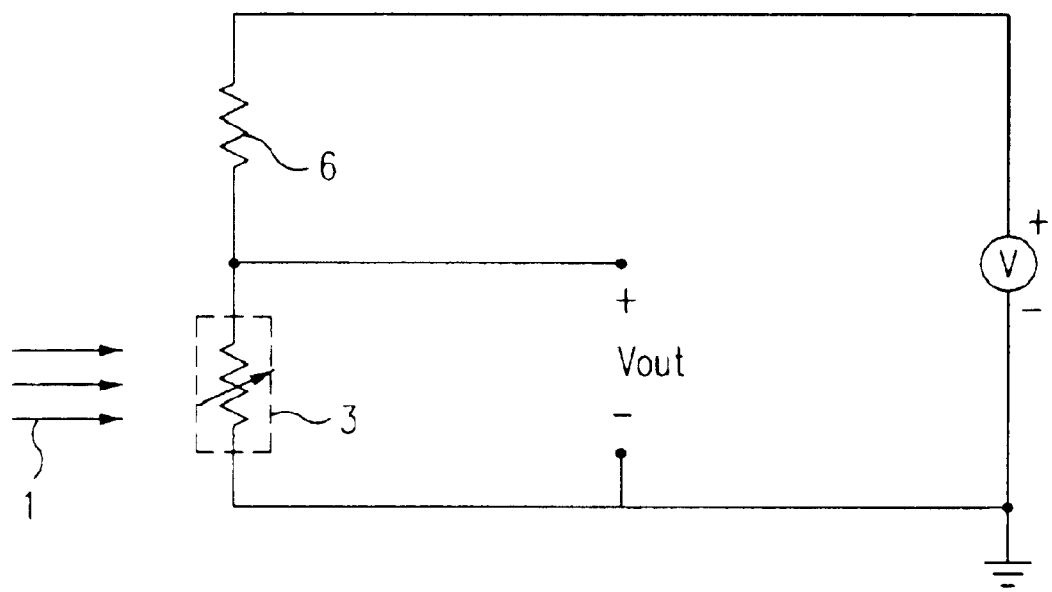
FIG. 1 shows a conventional circuit for measuring microbolometer resistance.
Figure 2:
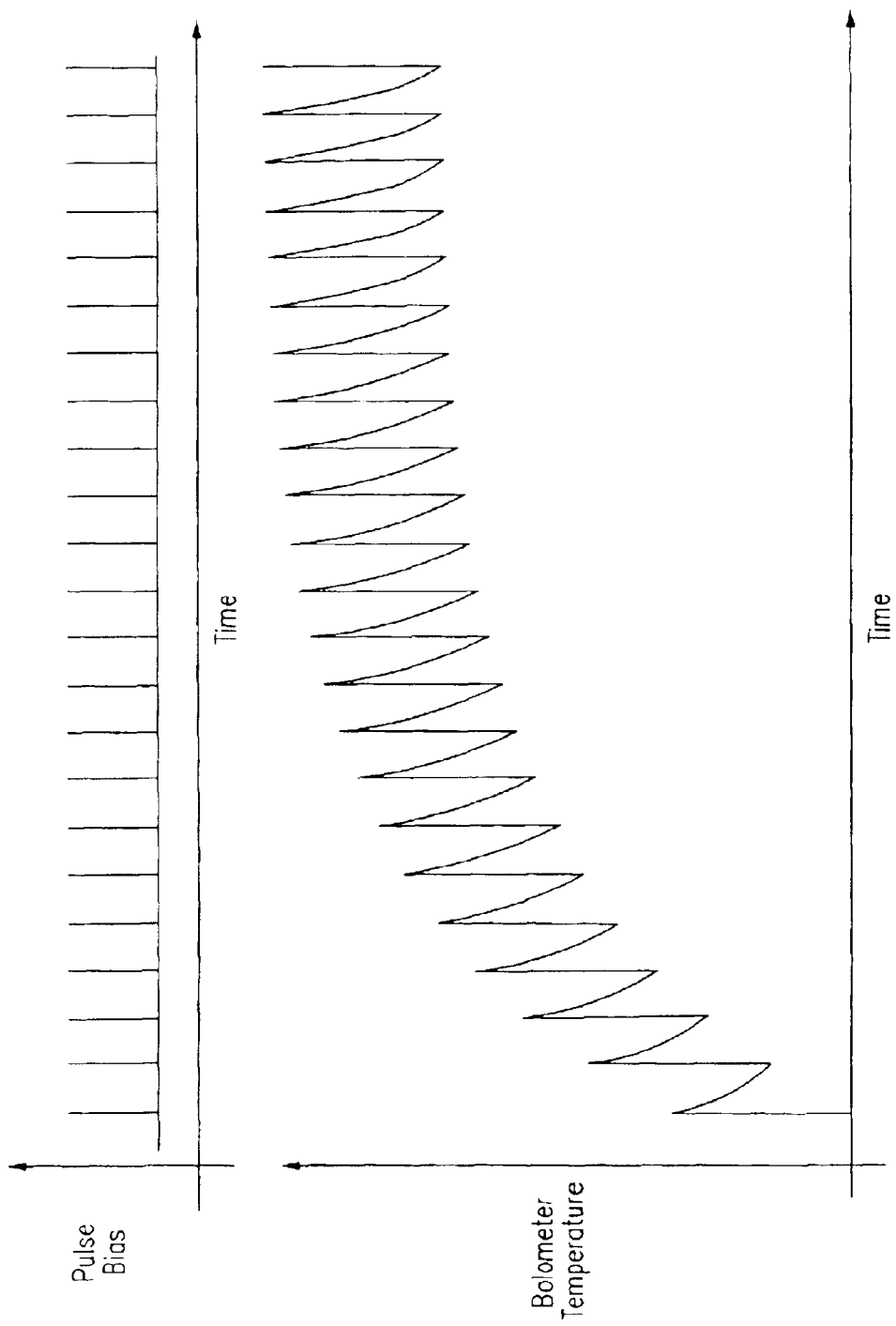
FIG. 2 shows a graph of microbolometer temperature over many sample periods.
Figure 5:
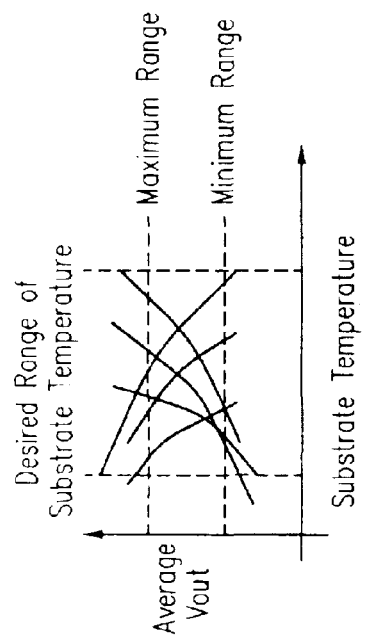
FIG. 5 shows a graph of six microbolometer circuit output voltages from a microbolometer array as a function of substrate temperature.
Figure 6:
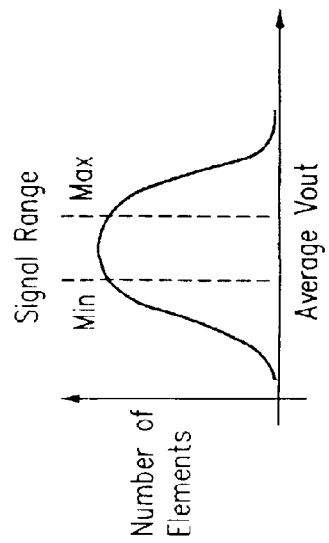
FIG. 6 shows a histogram of microbolometer circuit output voltage for a microbolometer array relative to a desired signal range.
Figure 3:
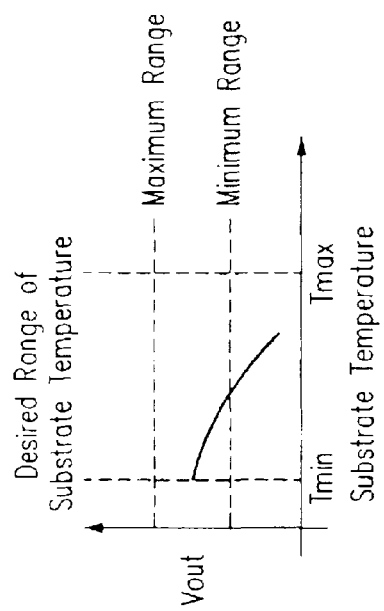
FIG. 3 shows a graph of microbolometer circuit output voltage as a function of substrate temperature.
Figure 4:
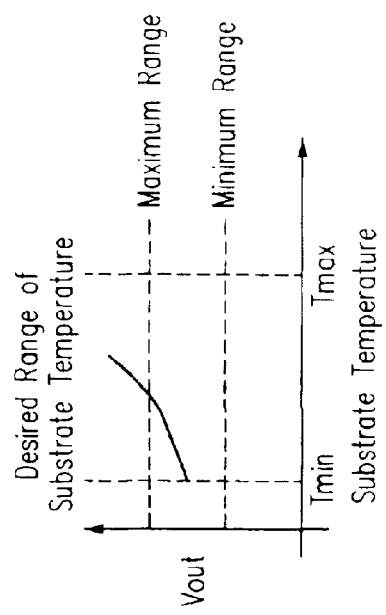
FIG. 4 shows a graph of another microbolometer circuit output voltage as a function of substrate temperature.

As another example, resistor 26 and microbolometer 24 may have a lower composite TCR relative to microbolometer 36, with resistor 26 having a lower TCR than microbolometer 24. Output voltage (Vout) 42 would have a response, for example, such as shown in FIG. 3. Thus, the contribution of any resistance by resistor 26 would only further degrade performance due to its low relative TCR. However, by the proper selection of a resistance value for resistor 38, which has a lower TCR than microbolometer 36 (the load), the composite TCR of resistor 38 and microbolometer 36 is lower than the TCR of microbolometer 24, producing a curve, for example, as shown in FIG. 4. Thus, resistor 26 can then be set, as discussed above, to obtain the desired output response, such as illustrated in FIG. 8.

It should be understood that FIGS. 7a and 7b is an exemplary circuit to illustrate the relative TCR mismatch and temperature compensation techniques and that numerous modifications and variations are possible in accordance with the principles of the present invention. For example, resistor 38 may not be necessary, depending upon the characteristics of the microbolometers within the array. Resistors 26 and 38 may be implemented as parallel resistance, rather than series, relative to respective microbolometers, or some combination of series and parallel resistance may be implemented. The circuit arrangement may also vary, such as by interchanging the positions of resistor 26 and resistor 38 or the positions of microbolometer 24 and microbolometer 36. Additionally, one or more techniques discussed or referenced herein may be combined or selectively implemented, depending upon the application or various other factors.

Circuit 20 in FIG. 7a (or circuit 44 in FIG. 7b) can be implemented in an array configuration, with a portion of circuit 20 placed in the unit cell while the remainder is placed outside of the unit cell, such as in the column amplifier. For example, microbolometer 24 may be solely placed within the unit cell (along with associated selection circuitry, such as a row select transistor that is not shown).

Figure 12:
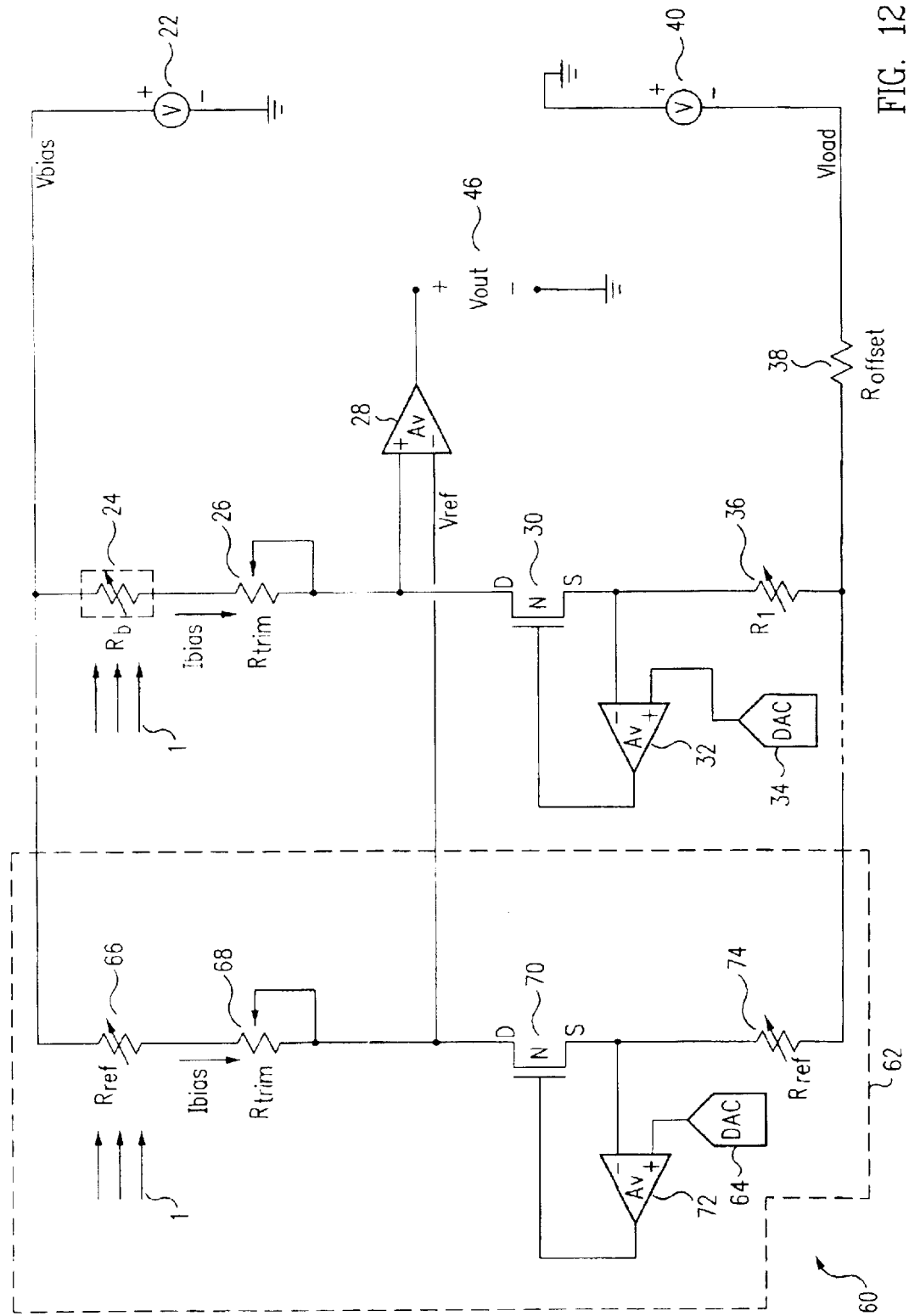
FIG. 12 shows a circuit providing temperature compensation in accordance with another embodiment of the present invention.

FIG. 12 shows a circuit 60 providing temperature compensation in accordance with another embodiment of the present invention. Circuit 60 is similar to circuit 44 of FIG. 7b, but includes a reference path 62. Reference path 62 includes thermally shorted microbolometers 66 and 74, variable resistor 68, a transistor 70, an amplifier 72, and a DAC 64.

DAC 64 provides a reference voltage to amplifier 72, which is used to appropriately bias transistor 70. DAC 64 and resistor 68 are adjusted to provide a reference voltage for amplifier 28. Amplifiers 32 and 72 may have their reference voltage provided by a DAC or the reference voltage may be provided to amplifier 32 and/or 72 by a set reference voltage level (e.g., ground). Furthermore, microbolometer 66 and/or microbolometer 74 may be replaced by a resistor, which would provide the necessary temperature dependent reference behavior.

Reference path 62 will be affected by changes in substrate temperature in a similar fashion as the remaining portions of circuit 60. Consequently, the reference voltage to amplifier 28 will vary in temperature and, therefore, reference path 62 provides additional temperature compensation. Additionally, power supply noise from supply voltages 22 and 40 are reduced by the common mode input to amplifier 28.

Figure 13:
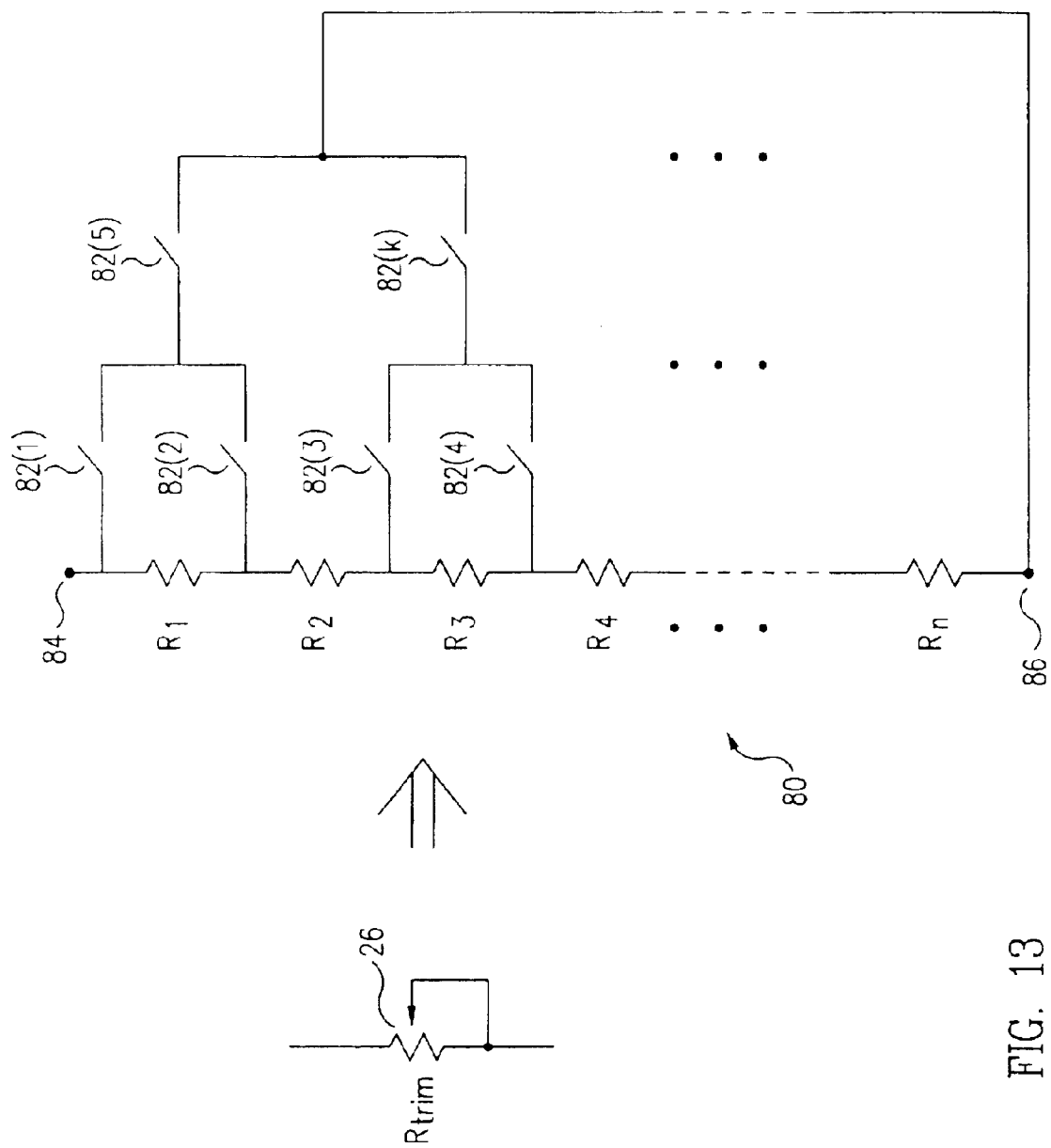
FIG. 13 shows exemplary circuitry for a circuit element in accordance with an embodiment of the present invention.

FIG. 13 shows an exemplary circuit 80 for resistor 26 in accordance with an embodiment of the present invention. Circuit 80 includes a number of resistors R1 through Rn, where n is a number greater than one. By the appropriate selection of switches 82, which are separately referenced as 82(1) through 82(k), where k is a number greater than one, the desired resistance between nodes 84 and 86 can be set. Switches 82 may represent transistors, which could then be switched or controlled by a digital or analog signal. Therefore, circuit 80 provides a variable resistor whose value may be digitally selectable.

Figure 14:
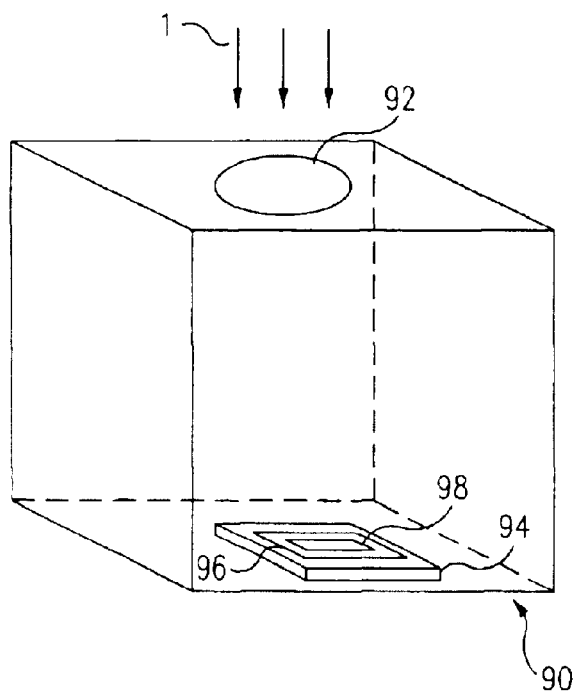
FIG. 14 shows exemplary packaging for a microbolometer FPA in accordance with an embodiment of the present invention.

FIG. 14 shows an exemplary enclosure 90 for a microbolometer FPA in accordance with an embodiment of the present invention. Enclosure 90 includes an optical element 92, such as a window or lens, through which incident infrared radiation 1 travels to reach a microbolometer array 98 mounted on a substrate 96 that is physically and thermally secured and attached to a surface 94 of enclosure 90. Optical element 92 may be made, for example, of silicon, germanium, or crystals (e.g., irtran) and enclosure 90 may be made, for example, of ceramic, iron-nickel alloy (e.g., Kovar), or metal or metal alloys (e.g., steel). Enclosure 90 contains the microbolometer FPA circuitry and provides appropriate electrical pins, bond pads, or connections to couple to associated electronics, such as to infrared camera electronics.

In a conventional microbolometer FPA packed assembly with a thermo-electric cooler, there may be a dynamic range degradation due to unwanted infrared radiation transmitted from the enclosure of the microbolometer FPA if the enclosure were to have a change in temperature independently from the sensor (e.g., FPA). However, by implementing techniques discussed herein, infrared radiation, such as from enclosure 90 is factored into the calibration process and accounted for, which reduces the associated dynamic range degradation.

Figure 15:
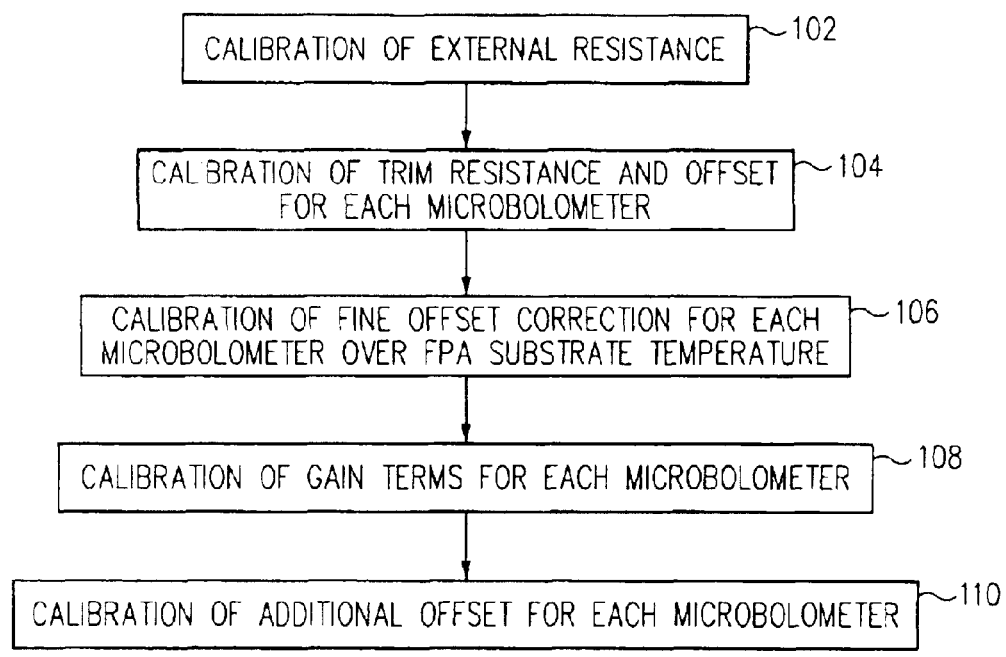
FIG. 15 is a top-level flowchart of a calibration process in accordance with an embodiment of the present invention.

FIG. 15 is a top-level flowchart 100 of a calibration process in accordance with an embodiment of the present invention. Flowchart 100 includes steps 102 through 110 for calibrating a microbolometer FPA. Step 104 is a required step and steps 102 and 106 through 110 may be optional steps, depending upon the microbolometer FPA behavior or performance, the desired application, and required performance. FIGS. 16 through 19 provide exemplary detailed flowcharts pertaining to steps 102 through 110.

The external resistance is calibrated in step 102. The term "external resistance" refers, for example, to the resistance of a resistor such as resistor 38 of FIG. 7a, which is typically placed outside of the unit cell and is not part of the variable (or trim) resistance (e.g., resistor 26 of FIG. 7a). The external resistance or the value of the external resistor may be digitally selectable and/or may be a global resistor and may be on or off-chip (i.e., on or off the FPA or the ROIC). Therefore, one external variable resistor or a few external variable resistors may be sufficient for a large microbolometer FPA. For example, as each microbolometer in the array is sampled, the global external resistor is set to its calibrated value, determined during the calibration process, corresponding to that particular microbolometer, column, group, or array of microbolometers. As discussed above, depending upon the behavior of the microbolometers in the FPA, an external resistor may not be required.

The variable resistance and offset is calibrated for each microbolometer in step 104. The variable resistance or trim resistance refers, for example, to the resistance of a resistor (a trim resistor) such as resistor 26 in FIG. 7*a*. For example, step 104 determines the amount of resistance to be placed in series with each microbolometer in the FPA. Step 104 also determines the amount of offset to be applied for each microbolometer in the FPA. As an example, the determined offset for each microbolometer may be set by using DAC 34 to control the gate bias of transistor 30 via amplifier 32 in FIG. 7*a*.

Step 106 provides fine offset correction calibration for each microbolometer circuit output over the desired substrate temperature range. Various techniques may be employed to provide a fine correction to each microbolometer circuit output after step 104 and possibly step 102 are performed, because these steps then provide a correctable microbolometer circuit output over a wide range of substrate temperature. The techniques may include various mathematical best-fit or offset correction algorithms or look-up table methods to determine the fine offset correction factor for a given temperature. For example, Lagrange terms enable a polynomial offset correction to be generated in real-time for each microbolometer that compensates for variations in microbolometer circuit output over FPA substrate temperature.

Step 108 provides gain calibration for each microbolometer. The gain terms normalize the response of each microbolometer to incident infrared radiation. This step may simply determine the gain term independent of FPA substrate temperature or, in a more general fashion, determine the gain term as a function of FPA substrate temperature. Similar mathematical best-fit, correction algorithms, or look-up table methods can be provided for these terms. Step 110 provides an additional fine offset, if required, for each microbolometer. The offset also may be a function of FPA substrate temperature.

Figure 16:
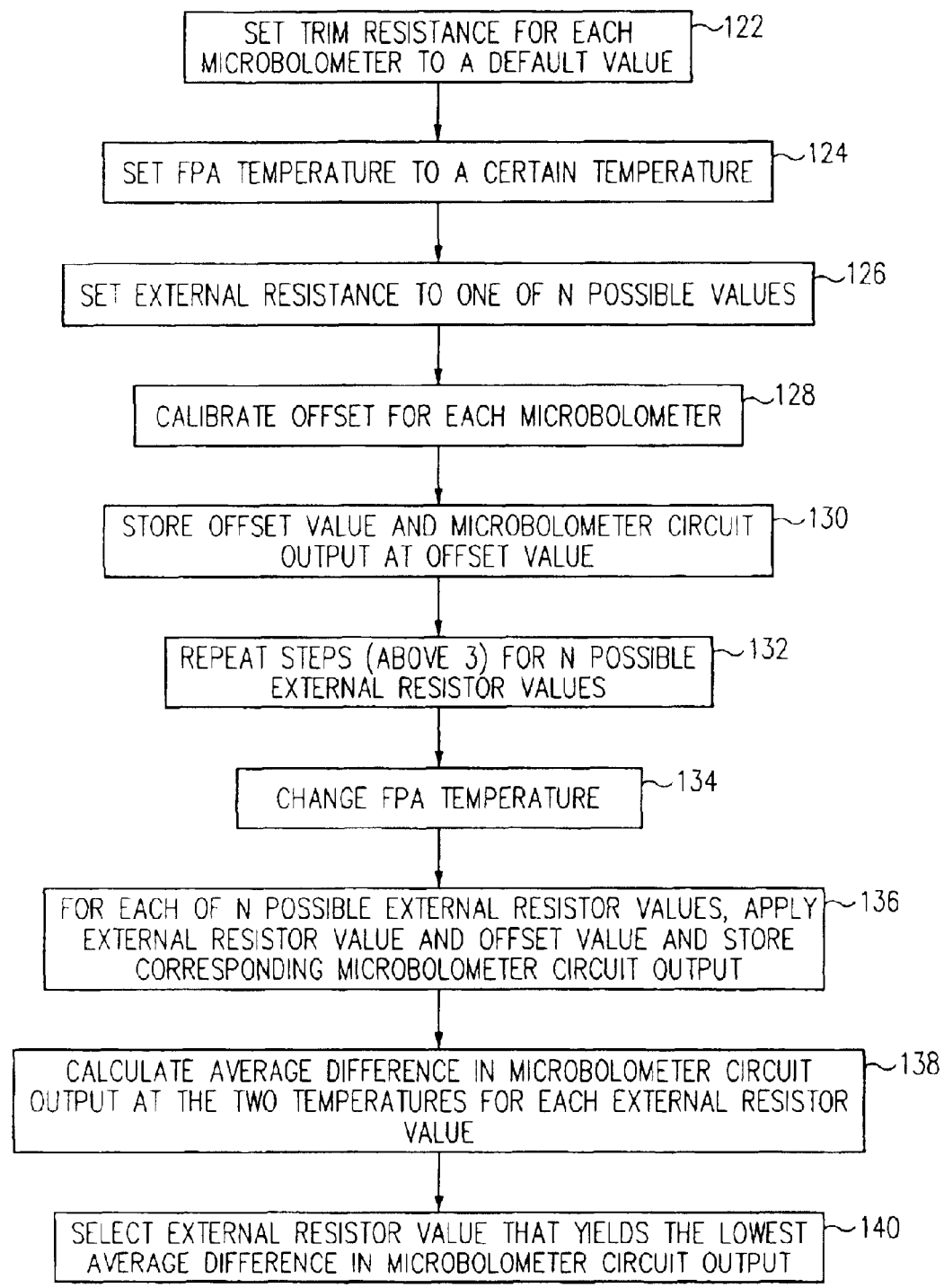
FIG. 16 is a detailed flowchart for a step of the flowchart in FIG. 15.

FIG. 16 is a detailed flowchart 120 for step 102 of flowchart 100 in FIG. 15. Flowchart 120 provides exemplary calibrations steps for calibrating the external resistor. Step 122 sets the trim resistor for each microbolometer to a target value, such as the mean value of the trim resistor. The FPA temperature is then set to a value (i.e., T1) within the desired calibration or operation temperature range (step 124). For example, T1 may represent the value of the minimum operating temperature range. The external resistor is then set to one of its "n" possible values (step 126) and the offset is calibrated for each microbolometer (step 128), where the offset may be calibrated using the procedure described below. The offset value and microbolometer circuit output value, obtained after application of the offset value, is stored (step 130) and steps 126 through step 128 are repeated for each of the n possible external resistor values (step 132). The result is n pairs of external resistor and offset values along with each corresponding microbolometer circuit output value.

The FPA temperature is then changed to another value (e.g., T2) within the desired calibration range (step 134). The stored external resistor and offset values are applied, for each value of n, and the microbolometer circuit output value is recorded (step 136). For each value of n, step 138 calculates the difference between the microbolometer circuit output from step 136 (i.e., at T1) and the microbolometer circuit output from step 132 (i.e., at T2) and then calculates the average difference across the full array of microbolometers. Step 140 selects the external resistor value corresponding to the smallest average difference obtained from step 138, with this resistor value being the calibrated value of the external resistor for the entire microbolometer FPA.

Figure 17:
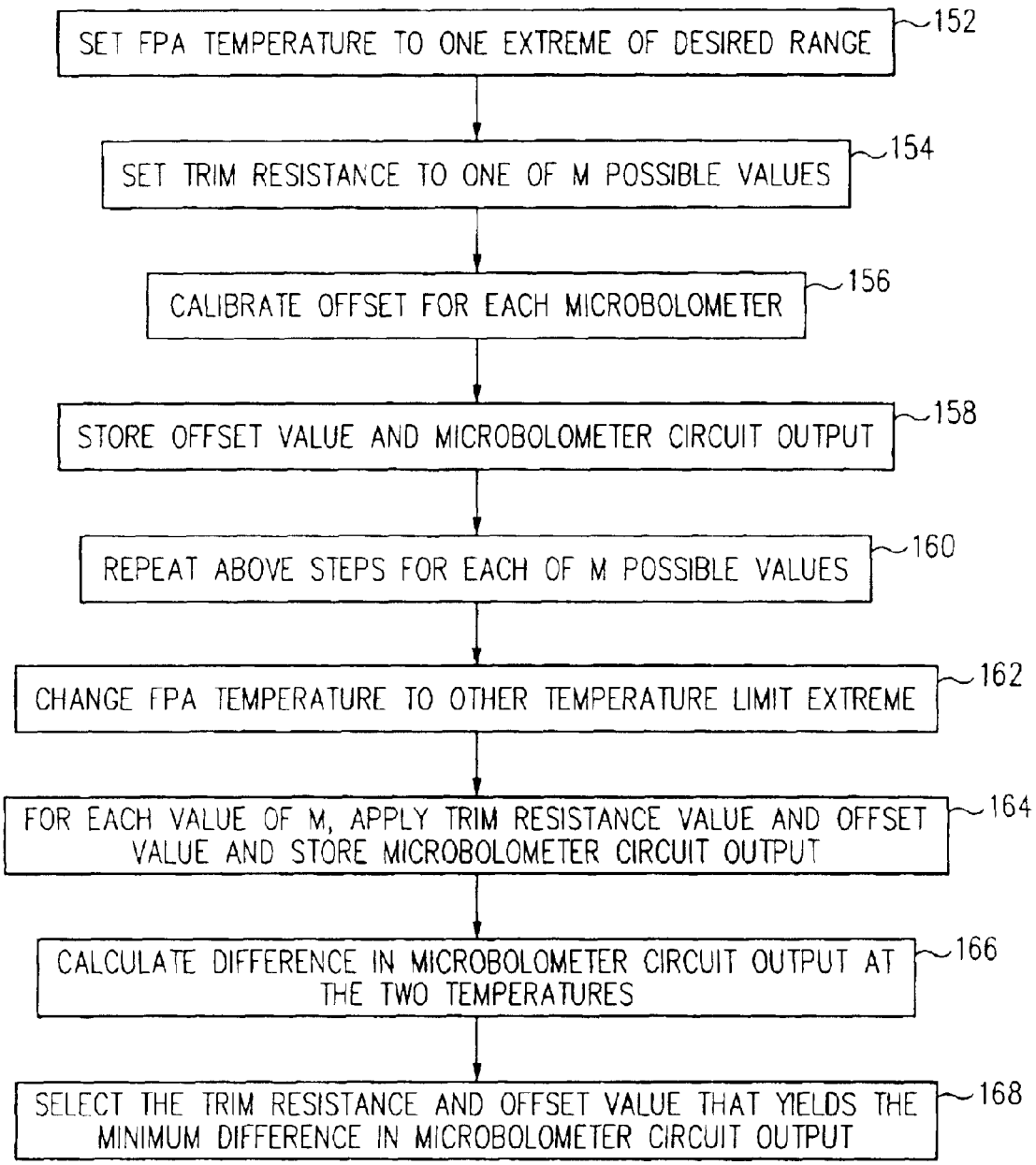
FIG. 17 is a detailed flowchart for a step of the flowchart in FIG. 15.

FIG. 17 is a detailed flowchart 150 for the trim resistance calibration in step 104 of flowchart 100 in FIG. 15. Flowchart 150 provides exemplary calibration steps for calibrating the trim resistor. Step 152 sets the FPA substrate temperature to one extreme of the desired operating or calibration temperature range (e.g., T1). The trim resistor is set to one of "m" possible values (step 154), such as the minimum value, and then the offset is calibrated (step 156) using a procedure, such as the one described below. The offset value and the resulting microbolometer circuit output value, after application of the offset value, are recorded for the given trim resistor value (step 158). Step 160 repeats steps 154 through 158 for each of the m possible trim resistor values, which results in m pairs of trim resistor/offset values and corresponding microbolometer circuit output values.

Figure 20:
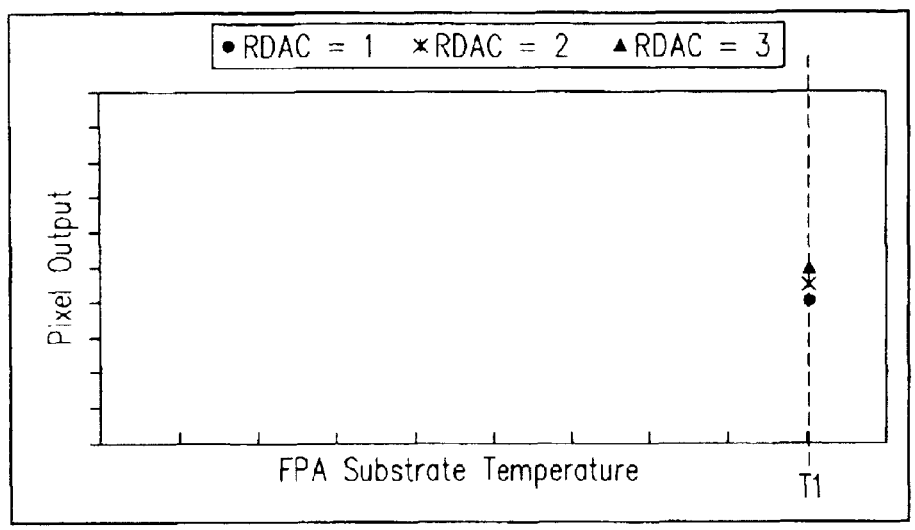
FIG. 20 shows a graph and accompanying table illustrating a calibration operation in accordance with an embodiment of the present invention.

FIG. 20 shows a graph and accompanying table illustrating a calibration operation in accordance with an embodiment of the present invention. Specifically, FIG. 20 provides an exemplary illustration of the trim resistor calibration through step 160 of flowchart 150 for a single microbolometer and three possible trim resistor values (i.e., m equals three). As can be seen in the chart of FIG. 20, the microbolometer circuit output (or pixel output) is plotted for a given FPA substrate temperature (T1). The accompanying table provides a tabulation of trim resistor value (RDAC value), offset value (ODAC value), and pixel output value at temperature T1 for the three trim resistor values. The labels "RDAC value" and "ODAC value" refer to the resistor and offset values being digitally selectable or controlled, as discussed above and illustrated in the figures. The pixel output value is listed as a percentage of the microbolometer circuit output dynamic range or desired output range.

Figure 21:
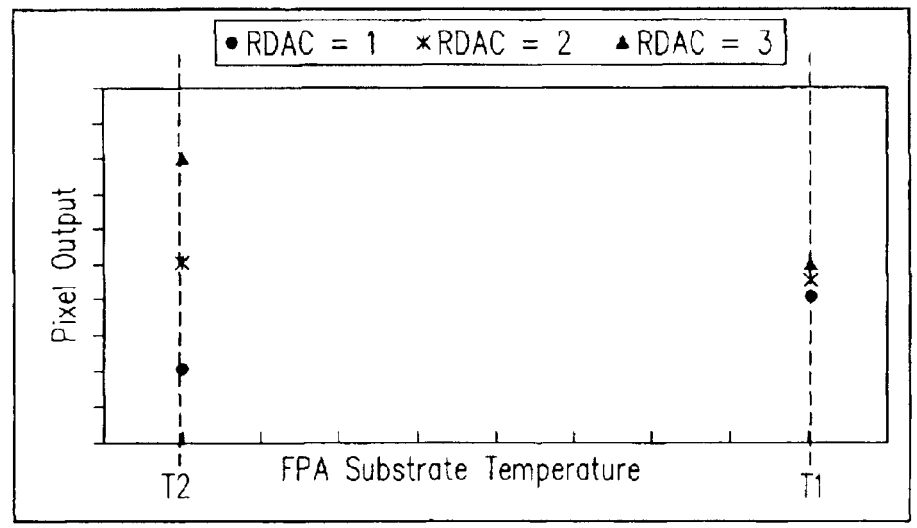
FIG. 21 shows a graph and accompanying table illustrating a calibration operation in accordance with an embodiment of the present invention.

Returning back to FIG. 17, the FPA substrate temperature is then changed to a value (T2) at the opposite extreme as the prior value (T1) of the desired calibration or operating temperature range (step 162). For each value of m, the corresponding trim resistor value and offset value obtained in steps 154 through 160 are applied and the microbolometer circuit output value is recorded (step 164). FIG. 21 shows a graph and accompanying table, illustrating step 164, in accordance with an embodiment of the present invention. FIG. 21 is similar to FIG. 20, but now includes the three exemplary microbolometer circuit output values obtained at temperature T2.

For each value of m (FIG. 17—step 166), the difference is calculated between the microbolometer circuit output from step 164 (i.e., at temperature T2) and the microbolometer circuit output obtained from step 158 (i.e., at temperature T1). Step 168 selects the trim resistor value and associated offset value that corresponds to the minimum difference from the results of step 166. These values are the calibrated values for the trim resistor and offset. Note that, if desired, the offset can be re-calibrated at a different FPA temperature value or with a different target value. This would provide a wider temperature operating range and more well-behaved performance.

Figure 22:
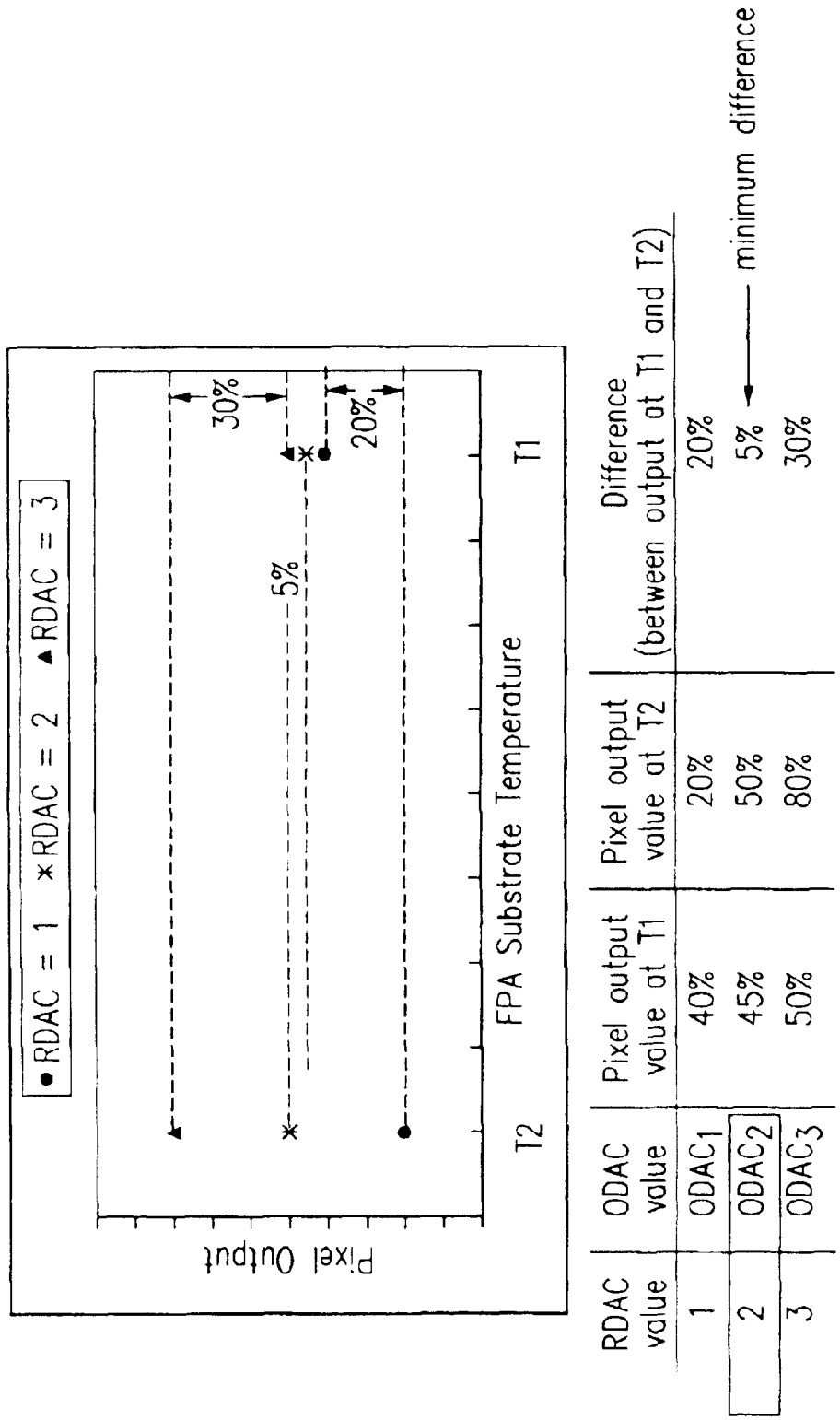
FIG. 22 shows a graph and accompanying table illustrating a calibration operation in accordance with an embodiment of the present invention.

FIG. 22 shows a graph and accompanying table illustrating steps 166 and 168 in accordance with an embodiment of the present invention. FIG. 22 is similar to FIG. 21, but now includes the difference calculation of values between the two temperature settings and the selection of the trim resistor/offset that generates the minimum difference.

For step 104 of flowchart 100 in FIG. 15, the offset value is determined for each microbolometer in the FPA. The offset value, for example, can be determined for each microbolometer by using a binary search to find the offset value that adjusts the microbolometer circuit output value closest to a desired value (i.e., microbolometer circuit output target value). The temperature of the FPA substrate and other parameters, such as the flux incident on the FPA, should generally not vary substantially while the offset calibration is in process.

Figure 18:
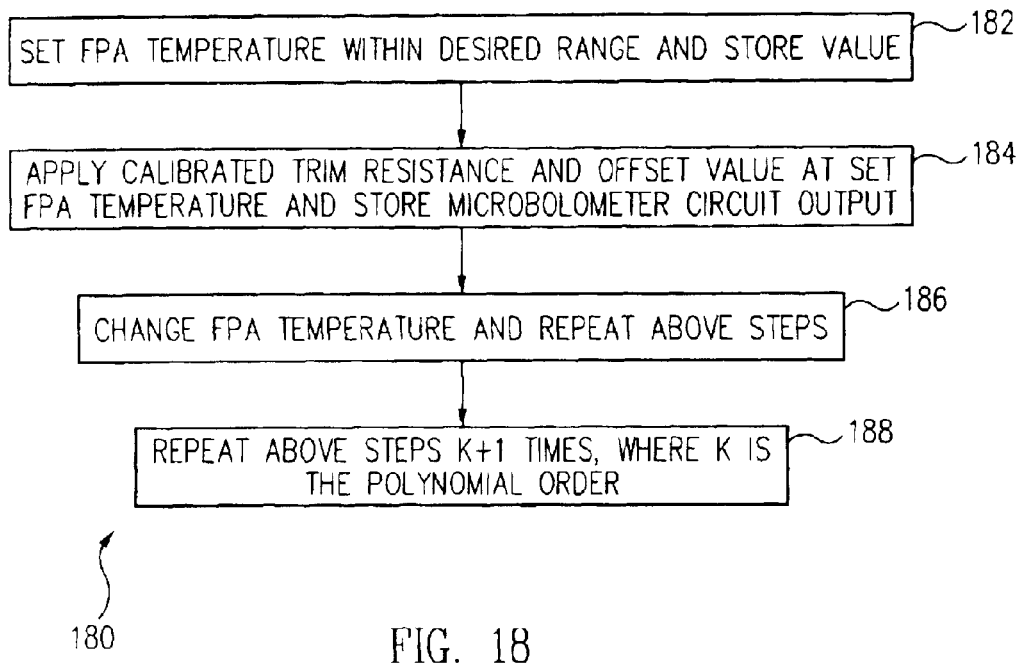
FIG. 18 is a detailed flowchart for a step of the flowchart in FIG. 15.

FIG. 18 is a detailed flowchart 180 for step 106 of flowchart 100 in FIG. 15. Flowchart 180 provides exemplary calibrations steps for calibrating the fine offset correction (e.g., Lagrange) terms for a microbolometer in the FPA array. However, the exemplary procedure could be employed in the more general case to calibrate many pixels simultaneously. Step 182 sets the FPA temperature to a value within the desired calibration or operating range and records the measured temperature value (having temperature units, such as Kelvin or Celsius, or units of volts that correspond to a given temperature). For this temperature, the microbolometer circuit output is recorded after the application of the calibrated trim resistor and offset values (step 184).

The FPA temperature is then changed, at step 186, to another value within the desired temperature range and steps 182 and 184 are repeated. Step 188 repeats step 186 a minimum of K+1 times, where K represents the desired order of the polynomial correction. For example, a minimum of four terms is stored if the third order polynomial correction is desired. The polynomial correction results generally improve if two of the K+1 points are at the opposite extremes of the desired calibration range.

The gain of each microbolometer can be calibrated using a two-point calibration process (e.g., at two different values of incident flux) at any arbitrary FPA temperature. Alternatively, the gain of each microbolometer can be calibrated as a function of FPA temperature, such as in the calibration process described below. Both procedures are similar to the fine offset (e.g., Lagrange) correction described above in reference to FIG. 18, but the two procedures (i.e., gain and fine offset) differ from each other in that instead of storing each microbolometer circuit output at a single value of incident flux, each microbolometer circuit output is stored for two values of incident flux.

Figure 19:
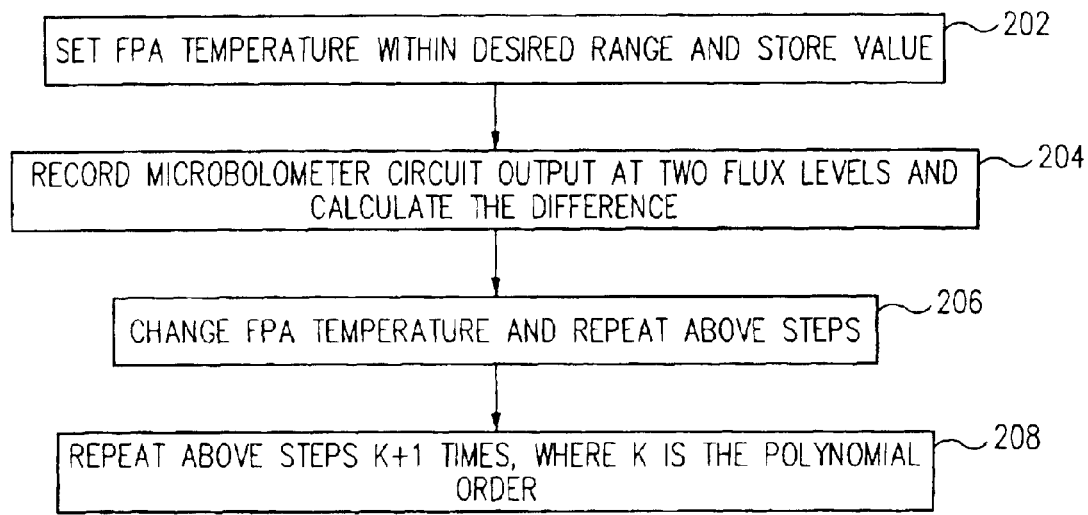
FIG. 19 is a detailed flowchart for a step of the flowchart in FIG. 15.

FIG. 19 is a detailed flowchart 200 for step 108 of flowchart 100 in FIG. 15. Flowchart 200 provides exemplary calibration steps for calibrating the gain of each microbolometer. Step 202 sets the FPA temperature to a value within the desired calibration or operating range and the temperature value is recorded (in units of temperature, such as Kelvin or Celsius, or in units of voltage that correspond to a given temperature). Step 204 records the microbolometer circuit output difference for two flux levels or responsivity for that temperature for each microbolometer. Step 206 changes the FPA temperature to another value within the calibration or operating range and the temperature value and each microbolometer circuit output is recorded. Step 206 is repeated (in step 208) a minimum of K+1 times, where k represents the desired order of the polynomial fit of the gain terms.

Figure 23:
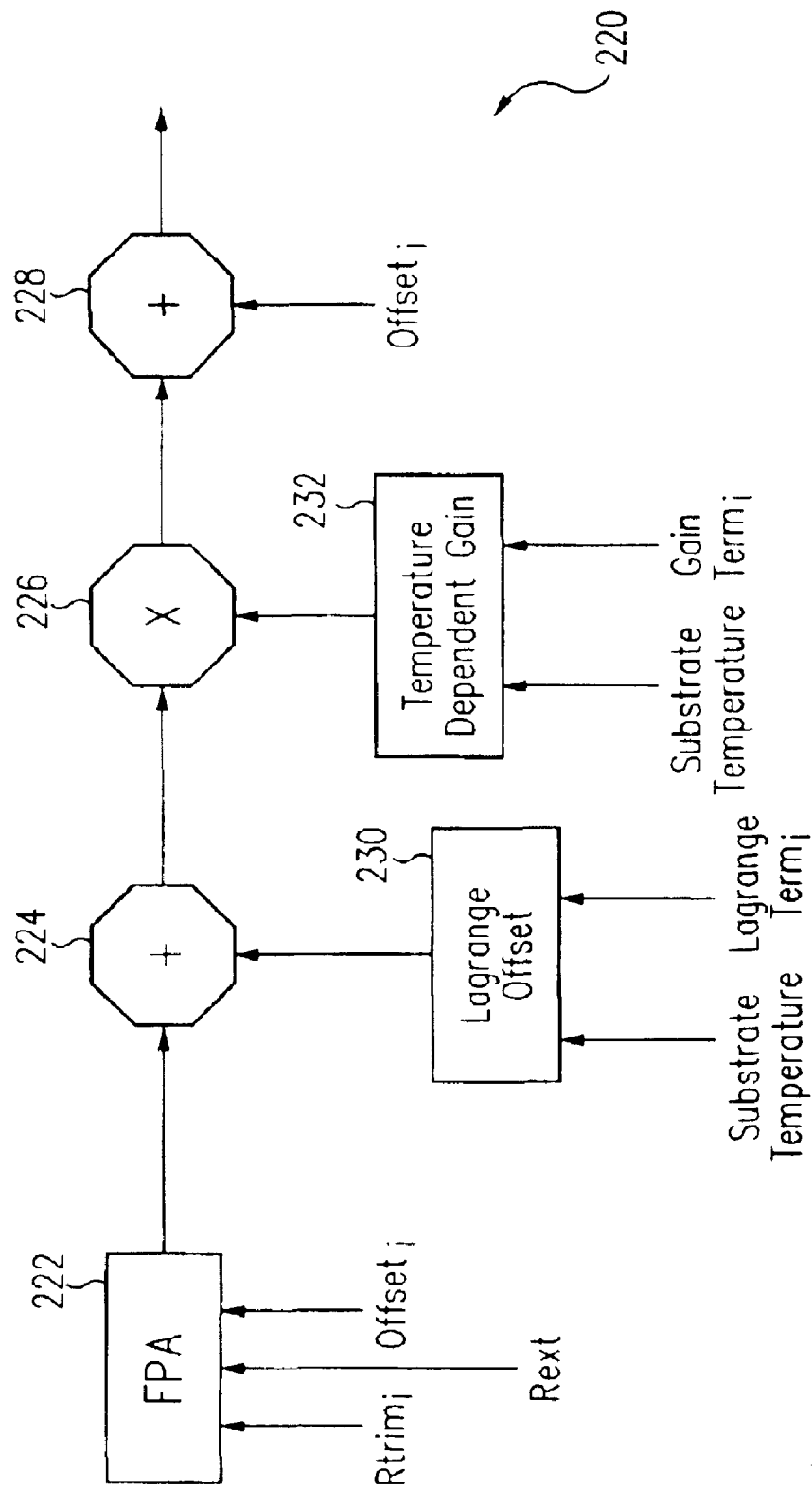
FIG. 23 illustrates a compensation process in accordance with an embodiment of the present invention.

FIG. 23 illustrates a compensation process 220 in accordance with an embodiment of the present invention. Compensation process 220 illustrates generally the overall compensation process for providing an optimal output from each microbolometer in the FPA over the desired FPA temperature range. The microbolometer FPA is represented symbolically by an FPA 222. As shown, each microbolometer in the array receives a trim resistor ($Rtrim_i$, where i ranges from $1 \leq i \leq$ maximum number of microbolometers in the array) and an offset calibration ($Offset_i$) adjustment. The trim resistor calibration and the offset calibration adjust each microbolometer circuit output over the calibrated temperature range from, for example, what is shown in FIGS. 3 or 4 to what is shown in FIG. 8. An external resistor (Rext) calibration is also optionally performed as described above, depending upon microbolometer FPA behavior. There may be an external resistor digitally selectable for each microbolometer or there may be one global external resistor that is calibrated for the entire microbolometer FPA.

The microbolometer circuit outputs from FPA 222 are combined in block 224 with the calibrated temperature-dependent fine (e.g., Lagrange) offset 230. The fine offset may be determined in any of a number of methods or techniques, as discussed herein. FIG. 23 refers to the fine offset as Lagrange offset 230, which is one exemplary method, but the fine offset is not intended to be limited solely to this exemplary method. Lagrange offset 230 provides the calibrated polynomial correction values for each microbolometer circuit output, which can be summed with each microbolometer circuit output from FPA 222. As shown in FIGS. 8 and 10, the microbolometer circuit outputs over the calibrated temperature range tend to produce a curved or bowed output curve, after application of the trim resistor, offset, and possibly external resistor calibrated values. The application of Lagrange offset 230 refines the microbolometer circuit output behavior and provides a more uniform output (i.e., reduces the curve or bow in microbolometer circuit output over temperature). Lagranae offset 230 receives as inputs the measured substrate temperature and the Lagrange terms ($Lagrange\ Term_i$), which are used to generate the Lagrange offset terms uniquely for each microbolometer in the array.

A block 226 receives the microbolometer circuit outputs, after application of the Lagrange offsets, and multiplies the microbolometer circuit outputs by a corresponding calibrated temperature dependent gain 232. The gain adjusts each microbolometer circuit output to provide a more uniform response to incident flux. As shown, the gain is temperature dependent and receives as inputs the measured substrate temperature and the gain terms ($Gain\ Term_i$), which are used to generate the temperature dependent gain uniquely for each microbolometer in the array.

A block 228 receives the microbolometer circuit outputs, after application of the gain adjustment, and sums the microbolometer circuit outputs with additional offset terms ($Offset_j$), with the offset for block 228 typically differing from the offset input to FPA 222. For example, the offset term is updated periodically during camera operation using a shutter, a chopper, or a scene-based algorithm.

It should be appreciated that the implementation of the trim resistor within each microbolometer circuit provides the correctable microbolometer FPA performance over a wide temperature range. The correctable microbolometer FPA performance over the calibrated temperature range then permits the application of Lagrange offset, gain, and offset calibration over the wide calibrated temperature range. It should also be appreciated that the principles of this invention may be implemented or applied to a wide variety of circuit devices and materials. Accordingly, the embodiments described herein are only exemplary of the principles of the invention and are not intended to limit the invention to the specific embodiments disclosed.

Figure 24:
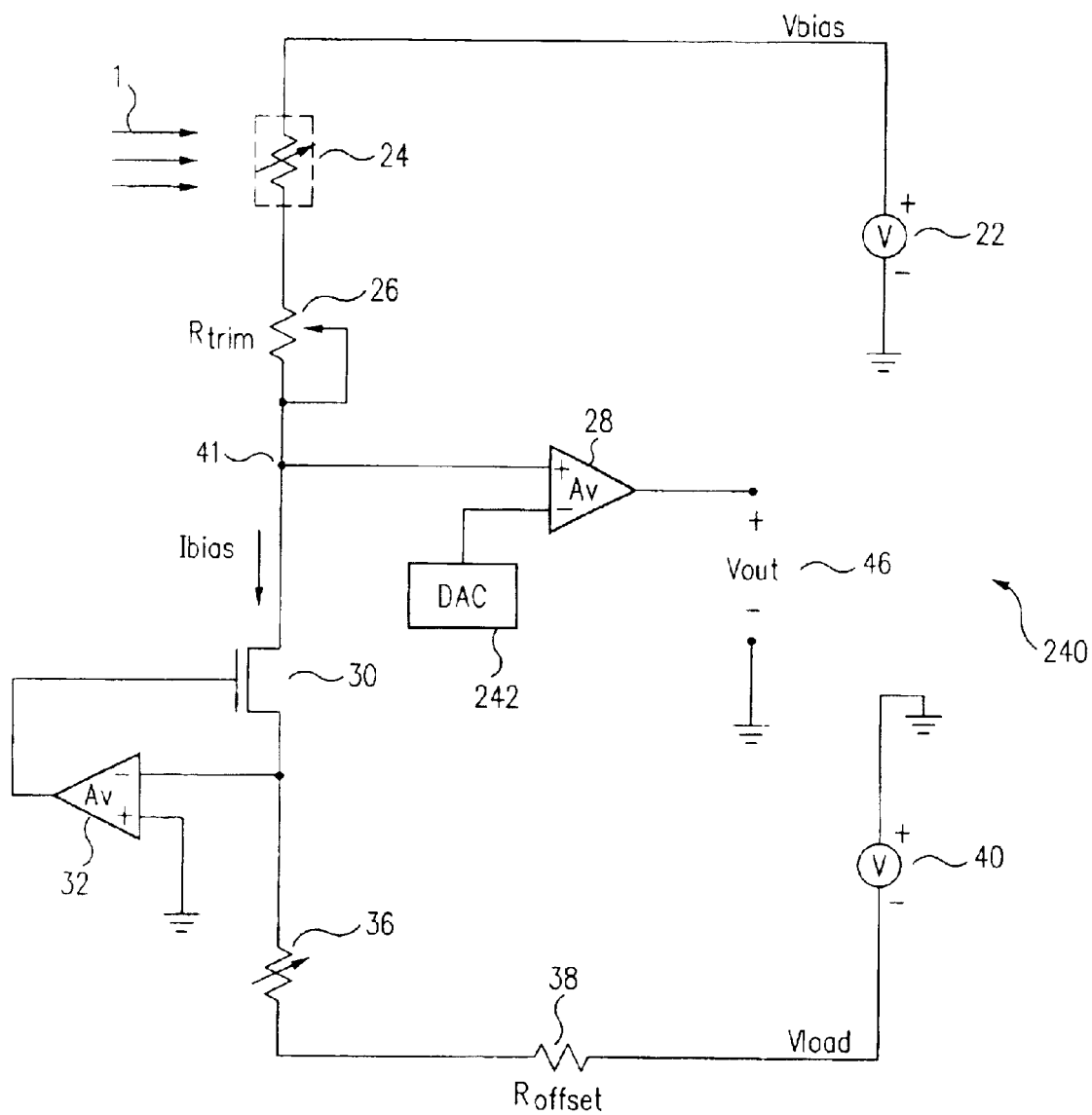
FIG. 24 shows a circuit for providing temperature compensation in accordance with another embodiment of the present invention.

FIG. 24 shows a circuit 240 for providing temperature compensation in accordance with another embodiment of the present invention. Circuit 240 is similar to circuit 44 of FIG. 7b, but illustrates that the voltage reference for amplifier 28 can be provided by a DAC 242. DAC 242 can be controlled to provide a varying voltage reference level, for example based on the measured substrate temperature. Amplifier 32 may have its positive input terminal tied to a ground voltage level (as shown in FIG. 24) or set by DAC 34 (as shown in FIG. 7b).

Figure 25:
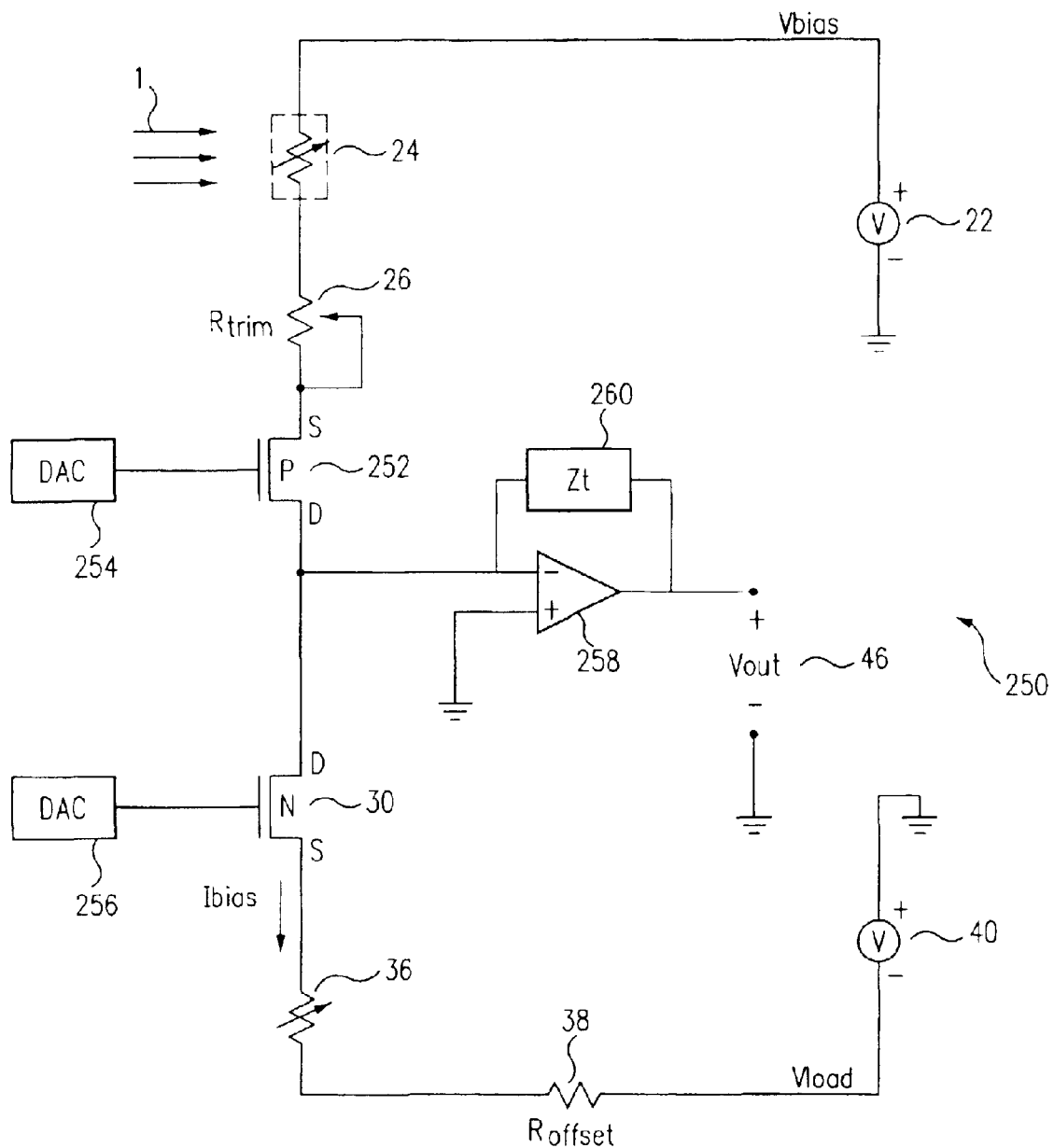
FIG. 25 shows a circuit for providing temperature compensation in accordance with another embodiment of the present invention.

FIG. 25 shows a circuit 250 for providing temperature compensation in accordance with another embodiment of the present invention. Circuit 250 includes supply voltages 22 and 40, microbolometers 24 and 36, resistors 26 and 38, transistors 30 and 252, DACs 254 and 256, an amplifier 258, an impedance element (e.g., a switched capacitor network) 260, and output voltage (Vout) 46.

Resistors 26 and 38, microbolometers 24 and 36, and supply voltages 22 and 40 operate in a similar manner as discussed above in reference to FIG. 7a and therefore the description will not be repeated. DACs 254 and 256 are coupled to the gate terminals of transistors 252 and 30, respectively, to control the bias applied to microbolometers 24 and 36, respectively. Specifically, DAC 254 adjusts the offset by controlling the bias applied to microbolometer 24 in combination with resistor 26 via transistor 252. DAC 256 adjusts the offset by controlling the bias applied to microbolometer 36 in series with resistor 38 via transistor 30.

Amplifier 258 and impedance element 260 form a transimpedance amplifier, which translates the current level flowing into the transimpedance amplifier into a voltage level at output voltage (Vout) 46. Consequently, DACs 254 and 256 determine the amount of current flowing through respective microbolometers 24 and 36 and also into the transimpedance amplifier and, thus, set the offset and reference level of output voltage (Vout) 46. DACs 254 and 256 can be calibrated, as discussed above, for a single temperature or over a desired operating temperature range for each microbolometer in the FPA array.

Figure 26:
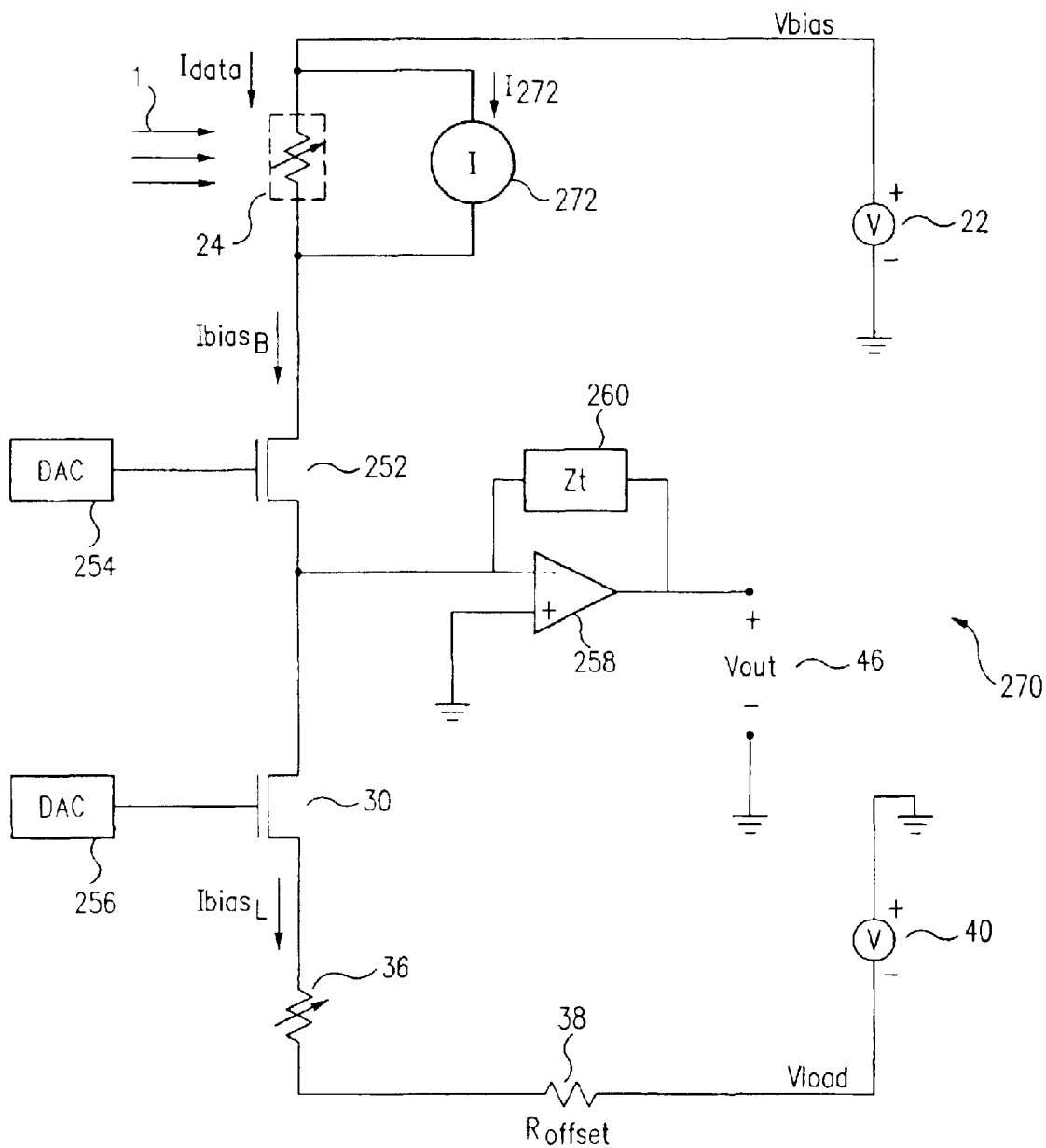
FIG. 26 shows a circuit for providing temperature compensation in accordance with another embodiment of the present invention.

FIG. 26 shows a circuit 270 for providing temperature compensation in accordance with another embodiment of the present invention. Circuit 270 is similar to circuit 250 of FIG. 25, but a current source 272 is provided and resistor 26 is eliminated. The amount of current flowing through microbolometer 24 to produce a microbolometer bias current (IbiasB) is reduced by the contribution of current by current source 272. Therefore, the voltage across microbolometer 24 is reduced and the change in the contribution of current (Ibolo) through microbolometer 24 to the microbolometer bias current (IbiasB) as a function of temperature is fractionally reduced. Thus, current source 272 has effectively lowered the TCR of microbolometer 24.

Figure 27:
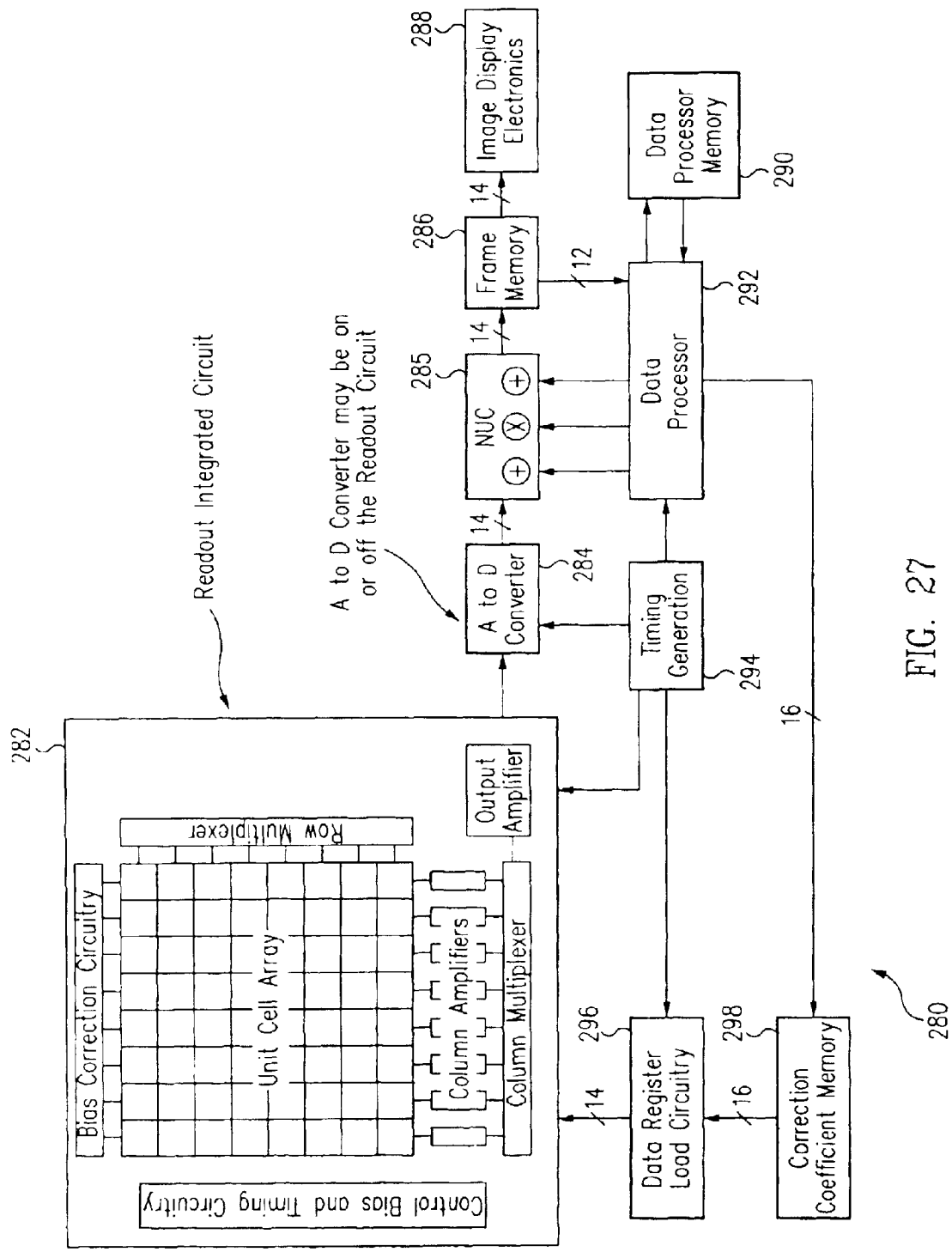
FIG. 27 shows a microbolometer read-out integrated circuit with bias-correction circuitry and interface system electronics in accordance with an embodiment of the present invention.

FIG. 27 shows a microbolometer readout integrated circuit with bias-correction circuitry and interface system electronics in accordance with an embodiment of the present invention. FIG. 27 includes a readout integrated circuit (ROIC) 282 that includes the microbolometer FPA, control circuitry, timing circuitry, bias circuitry, row and column addressing circuitry, column amplifiers, and associated electronics to provide output signals that are digitized by an analog-to-digital (A/D) converter 284. The A/D converter 284 may be located on or off ROIC (282).

The output signals from A/D converter 284 are adjusted by a non-uniformity correction circuit (NUC) 285, which applies temperature dependent compensation (e.g., Lagrange Offset, Temperature Dependent Gain, and additional Offset) as discussed above, such as in reference to FIG. 23. After processing by NUC 285, the output signals are stored in a frame memory 286. The data in frame memory 286 is then available to image display electronics 288 and a data processor 292, which also has a data processor memory 290. A timing generator 294 provides system timing.

Data processor 292 generates bias-correction data words, which are loaded into a correction coefficient memory 298. A data register load circuitry 296 provides the interface to load the correction data into readout integrated circuit 282. In this fashion the variable resistors, digital-to-analog converters, and other variable circuitry, which control voltage levels, biasing, circuit element values, etc., are controlled by data processor 292 so that the output signals from readout integrated circuit are uniform over a wide temperature range.

Embodiments described above illustrate but do not limit the invention. It should also be understood that numerous modifications and variations are possible in accordance with the principles of the present invention. Accordingly, the scope of the invention is defined only by the following claims.

We claim:

1. A microbolometer circuit comprising:
   a first microbolometer;
   a variable resistor coupled to the first microbolometer: and
   a biasing circuit coupled to the first microbolometer or the variable resistor to provide a load current, wherein the variable resistor is calibrated over a range of temperatures to compensate for a temperature coefficient of resistance difference between the first microbolometer and the biasing circuit.

2. The circuit of claim 1, wherein the biasing circuit comprises a second microbolometer.

3. The circuit of claim 2, further comprising an amplifier coupled at a node between the first microbolometer and the second microbolometer for providing an output signal from the microbolometer circuit.

4. The circuit of claim 3, further comprising a variable voltage source coupled to the amplifier to provide a voltage reference level.

5. The circuit of claim 3, further comprising:
   at least a first transistor coupled between the first microbolometer and the second microbolometer for controlling the amount of current flowing through the circuit; and
   a first voltage source coupled to the first microbolometer to bias the first microbolometer, wherein the first microbolometer, the at least first transistor, and the second microbolometer are in a series configuration.

6. The circuit of claim 5, further comprising:
   a first and a second reference microbolometer;
   a variable reference resistor coupled is series with the first and second reference microbolometers, wherein the variable reference resistor is calibrated to compensate for a temperature coefficient of resistance difference between the first and the second reference microbolometers; and
   a first reference transistor coupled in series with the first and second reference microbolometers, wherein the first and second microbolometers, the variable reference resistor, and the first reference transistor form a reference path to provide a reference voltage for the amplifier coupled between the first and second microbolometer.

7. The circuit of claim 2, further comprising a transistor, coupled between the first microbolometer and the second microbolometer, for biasing the amount of current flowing through at least one of the first microbolometer and the second microbolometer.

8. The circuit of claim 7, further comprising a variable voltage source coupled to a gate terminal of the transistor and controlling the biasing of the transistor.

9. The circuit of claim 7, further comprising a first amplifier coupled to a gate terminal of the transistor, wherein the amplifier is responsive to a reference voltage to control the transistor.

10. The circuit of claim 9, further comprising a digital-to-analog converter providing the reference voltage.

11. The circuit of claim 2, further comprising a resistor coupled to the second microbolometer, the resistor calibrated to adjust a temperature coefficient of resistance of the second microbolometer.

12. The circuit of claim 2, further comprising:
a first transistor coupled to the first microbolometer to control the amount of current flowing through the first microbolometer; and
a second transistor coupled to the second microbolometer to control the amount of current flowing through the second microbolometer.

13. The circuit of claim 12, further comprising a first variable voltage source coupled to a gate terminal of the first transistor and a second variable voltage source coupled to a gate terminal of the second transistor.

14. The circuit of claim 12, further comprising a transimpedance amplifier coupled between the first and second transistor.

15. The circuit of claim 1, further comprising a first voltage source coupled to the first microbolometer to bias the first microbolometer.

16. The circuit of claim 15, further comprising a second voltage source coupled to the biasing circuit.

17. A microbolometer circuit comprising:
a first microbolometer;
a current source coupled to the first microbolometer;
a second microbolometer coupled to the first microbolometer; and
an amplifier coupled to a node between the first microbolometer and the second microbolometer to provide an output signal from the microbolometer circuit.

18. The circuit of claim 17, wherein the current source is calibrated to compensate for a temperature coefficient of resistance difference between the first microbolometer and the second microbolometer.

19. The circuit of claim 17, further comprising a resistor coupled to the second microbolometer, the resistor calibrated to adjust a temperature coefficient of resistance of the second microbolometer.

20. The circuit of claim 17, further comprising at least one transistor coupled between the first microbolometer and the second microbolometer to control the amount of current flowing through the microbolometer circuit.

21. The circuit of claim 17, further comprising a first voltage source coupled to the first microbolometer to bias the first microbolometer.

22. The circuit of claim 21, further comprising a second voltage source coupled to the second microbolometer.

23. A two-dimensional array comprising a plurality of microbolometer circuits according to claims 1 or 17.

24. The circuit of claim 17, wherein the current source is coupled in parallel with the first microbolometer, with the current source calibrated to compensate for a temperature coefficient of resistance difference between the first microbolometer and the second microbolometer.

25. The circuit of claim 24, further comprising:
a resistor coupled to the second microbolometer, the resistor calibrated to adjust a temperature coefficient of resistance of the second microbolometer;
at least one transistor coupled between the first microbolometer and the second microbolometer to control the amount of current flowing through the microbolometer circuit; and
a first voltage source coupled to the first microbolometer to bias the first microbolometer.

26. The circuit of claim 25, further comprising a reference circuit coupled to the amplifier to provide a reference voltage.

27. A microbolometer focal plane array circuit comprising:
an array of microbolometer cells, each containing a first microbolometer; and
a temperature compensation circuit associated with each microbolometer cell, each temperature compensation circuit comprising a variable resistor.

28. The circuit of claim 27, wherein the temperature compensation circuit further comprises a second microbolometer coupled to the variable resistor.

29. The circuit of claim 28, wherein each temperature compensation circuit comprises at least one transistor coupled to the second microbolometer to control the amount of current flowing through the second microbolometer.

30. The circuit of claim 29, further comprising a variable voltage source coupled to a gate terminal of the transistor.

31. The circuit of claim 28, further comprising a resistor coupled to the second microbolometer to adjust a temperature coefficient of resistance of the second microbolometer.

32. The circuit of claim 28, further comprising a first voltage source coupled to each of the first microbolometers to bias the first microbolometers.

33. The circuit of claim 32, further comprising a second voltage source coupled to each of the second microbolometers.

34. The circuit of claim 28, further comprising:
an amplifier adapted to receive an output signal from at least one of the first microbolometers;
a first voltage source adapted to bias at least one of the first microbolometers;
at least one transistor adapted to control a bias current through the first microbolometer and/or the second microbolometer; and
a processor adapted to receive the output signal and set a value for one or more of the variable resistors and the bias current.

35. The circuit of claim 34, further comprising a reference circuit path adapted to provide a reference voltage for the amplifier, wherein the reference circuit path comprises:
a first reference microbolometer;
a first variable resistor coupled to the first reference microbolometer;
a second reference microbolometer; and
a first reference transistor, wherein the first and second reference microbolometer, the first variable resistor, and the first reference transistor are in series and the reference voltage is provided from a node between the first reference microbolometer and the second reference microbolometer.

36. The circuit of claim 34, wherein the variable resistor is calibrated to compensate for a temperature coefficient of resistance difference between the first microbolometer and the second microbolometer.

37. The circuit of claim 36, wherein the processor is further adapted to determine the amount of compensation for the output signal, wherein the compensation comprises a temperature dependent fine offset and a temperature dependent gain compensation.

38. The circuit of claim 37, wherein the compensation further comprises an additional offset and wherein the circuit further comprises a second variable resistor associated with one or more of the second microbolometers and whose value is set by the processor based on a temperature coefficient of resistance of the second microbolometer.

39. The circuit of claim 27, wherein the variable resistor is calibrated to compensate for a temperature coefficient of resistance difference between the first microbolometer and the second microbolometer.

40. The circuit of claim 27, further comprising an amplifier coupled to at least one of the first microbolometer and the temperature compensation circuit to provide an output signal.

41. The circuit of claim 40, further comprising a reference circuit coupled to the amplifier to provide a reference voltage.

42. The circuit of claim 40, further comprising a processor coupled to the amplifier to receive the output signal.

43. The circuit of claim 42, wherein the processor is coupled to the microbolometer focal plane array to provide input signals to control each of the temperature compensation circuits.

44. The circuit of claim 43, wherein the processor sets the value of the variable resistor corresponding to each microbolometer cell.

45. A method of calibrating a microbolometer detector circuit, the method comprising:
    calibrating a first variable resistor to compensate for a relative temperature coefficient of resistance between an active microbolometer and a load over a desired temperature range; and
    calibrating an offset for an output signal generated by the microbolometer detector circuit.

46. The method of claim 45, wherein the load comprises a reference microbolometer.

47. The method of claim 46, further comprising calibrating a resistance value for a second resistor to adjust a temperature coefficient of resistance for the reference microbolometer.

48. The method of claim 45, further comprising calibrating a fine correction to the output signal over the desired temperature range.

49. The method of claim 48, wherein the fine correction calibration comprises a polynomial that generates an offset to the output signal based on a temperature of the microbolometer detector circuit.

50. The method of claim 49, further comprising:
    calibrating a uniform gain to the output signal over the desired temperature range; and
    calibrating an additional offset to the output signal over the desired temperature range.

51. The method of claim 50, further comprising calibrating a resistance value for a second resistor to adjust a temperature coefficient of resistance for the load, wherein the load comprises a reference microbolometer.

52. The method of claim 45, further comprising calibrating a uniform gain to the output signal over the desired temperature range.

53. The method of claim 52, further comprising calibrating an additional offset to the output signal over the desired temperature range.

54. A method of detecting the level of incident infrared radiation, the method comprising:
    providing an active microbolometer to receive the infrared radiation;
    applying a voltage potential to the active microbolometer;
    providing a reference microbolometer to provide a reference relative to the active microbolometer;
    providing compensation for a temperature coefficient of resistance difference between the active microbolometer and the reference microbolometer over a certain temperature range; and
    generating an output signal based on a change in resistance of the active microbolometer due to the received infrared radiation level.

55. The method of claim 54, wherein the compensation provided for the temperature coefficient of resistance comprises a variable resistor whose value is calibrated over the temperature range.

56. The method of claim 55, wherein the variable resistor is in series with the active microbolometer and wherein the generating of the output signal is further based on a reference signal provided by a reference path having first and second reference path microbolometers and a variable reference resistor.

57. The method of claim 55, further comprising:
    providing a fine offset calibration for the output signal;
    providing a gain calibration for the output signal; and
    providing an additional offset calibration for the output signal.

58. The method of claim 54, wherein the compensation provided for the temperature coefficient of resistance comprises a current source, for the active microbolometer, whose value is calibrated over the temperature range.

* * * * *